United States Patent
Baker

(10) Patent No.: US 12,241,833 B2
(45) Date of Patent: Mar. 4, 2025

(54) MULTIPLEXING OF AN ACTIVE SENSOR DETECTOR USING STRUCTURED ILLUMINATION

(71) Applicant: Illumina, Inc., San Diego, CA (US)

(72) Inventor: Thomas Baker, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 879 days.

(21) Appl. No.: 16/242,895

(22) Filed: Jan. 8, 2019

(65) Prior Publication Data

US 2019/0212266 A1 Jul. 11, 2019

Related U.S. Application Data

(60) Provisional application No. 62/614,690, filed on Jan. 8, 2018.

(30) Foreign Application Priority Data

Mar. 20, 2018 (NL) .................................. N2020621

(51) Int. Cl.
*G01N 21/64* (2006.01)
*G02B 5/18* (2006.01)
(Continued)

(52) U.S. Cl.
CPC ..... *G01N 21/6428* (2013.01); *G01N 21/6454* (2013.01); *G01N 21/6456* (2013.01);
(Continued)

(58) Field of Classification Search
CPC ........... G01N 21/6428; G01N 21/6454; G01N 21/6456; G01N 21/6458;
(Continued)

(56) References Cited

U.S. PATENT DOCUMENTS 3,856,986 A 12/1974 Macovski
4,213,706 A 7/1980 Hill et al.
(Continued)

FOREIGN PATENT DOCUMENTS

AU 2019205317 B2 4/2021
CN 1292227 C 12/2006
(Continued)

OTHER PUBLICATIONS

Arpali, S., et al., High-throughput screening of large volumes of whole blood using structured illumination and fluorescent on-chip imaging, Lab Chip, 12 (23), Sep. 12, 2012, 4968-4971.
(Continued)

*Primary Examiner* — Samuel P Siefke
*Assistant Examiner* — Henry H Nguyen
(74) *Attorney, Agent, or Firm* — Dierker & Kavanaugh, P.C.

(57) ABSTRACT

The disclosure provides a structured illumination imaging system that utilizes an image sensor (e.g., an active pixel sensor) in an active plane of a patterned sample to increase image resolution. The imaged sample may be patterned and/or aligned over an image sensor such that each light sensor (e.g., pixel) of the image sensor has a respective plurality of features formed and/or mounted above it. In response to illumination, each of the features may emit fluorescent light that is collected by a pixel of the image sensor. During imaging, each pixel of the image sensor may be spatially multiplexed using structured illumination such that only a subset (e.g., one or two) of the features aligned over the pixel are illuminated with structured light during an image read.

11 Claims, 17 Drawing Sheets

(51) Int. Cl.
*G02B 21/00* (2006.01)
*G02B 21/06* (2006.01)
*G02B 21/08* (2006.01)
*G02B 21/16* (2006.01)
*G02B 21/36* (2006.01)

(52) U.S. Cl.
CPC ......... *G02B 21/0032* (2013.01); *G02B 21/06* (2013.01); *G02B 21/082* (2013.01); *G02B 21/16* (2013.01); *G02B 21/361* (2013.01); *G01N 21/6458* (2013.01); *G01N 2021/6463* (2013.01); *G01N 2201/0635* (2013.01); *G02B 5/1866* (2013.01)

(58) Field of Classification Search
CPC ... G01N 2021/6463; G01N 2201/0635; G02B 21/0032; G02B 21/06; G02B 21/082; G02B 21/16; G02B 21/361; G02B 5/1866; G02B 21/367; G02B 27/425
See application file for complete search history.

(56) References Cited

U.S. PATENT DOCUMENTS

| | | | |
|---|---|---|---|
| 5,761,085 | A | 6/1998 | Giorgio |
| 6,188,478 | B1 | 2/2001 | Fuchs et al. |
| 6,898,004 | B2 | 5/2005 | Shimizu et al. |
| 6,947,127 | B2 | 9/2005 | Wolleschensky et al. |
| 7,274,446 | B2 | 9/2007 | Wolleschensky et al. |
| 7,532,323 | B2 | 5/2009 | Tang et al. |
| 7,692,131 | B2 | 4/2010 | Fein et al. |
| 7,803,609 | B2 | 9/2010 | Kaplan |
| 8,160,379 | B2 | 4/2012 | Schaefer et al. |
| 8,222,040 | B2 | 7/2012 | Hong et al. |
| 8,244,479 | B2 | 8/2012 | Kain et al. |
| 8,502,867 | B2 | 8/2013 | Park |
| 8,509,879 | B2 | 8/2013 | Durkin et al. |
| 8,759,077 | B2 | 6/2014 | Hong et al. |
| 8,796,185 | B2 | 8/2014 | Kim et al. |
| 8,817,362 | B2 | 8/2014 | Lee |
| 8,848,199 | B2 | 9/2014 | Choi et al. |
| 9,458,501 | B2 | 10/2016 | Hong et al. |
| 9,465,228 | B2 | 10/2016 | Lee et al. |
| 9,772,505 | B2 | 9/2017 | Lee et al. |
| 10,378,053 | B2 | 8/2019 | Staker et al. |
| 10,429,665 | B2 | 10/2019 | Lee et al. |
| 2003/0048819 | A1 | 3/2003 | Nagano et al. |
| 2005/0239113 | A1 | 10/2005 | Ryu et al. |
| 2005/0239115 | A1 | 10/2005 | Ryu et al. |
| 2007/0046946 | A1* | 3/2007 | Namiki .......... G01J 3/453 356/456 |
| 2007/0139541 | A1 | 6/2007 | Fein et al. |
| 2008/0030628 | A1 | 2/2008 | Lundquist et al. |
| 2008/0242560 | A1 | 10/2008 | Gunderson et al. |
| 2009/0075838 | A1 | 3/2009 | El Gamal et al. |
| 2009/0219607 | A1 | 9/2009 | Saggau et al. |
| 2009/0225407 | A1 | 9/2009 | Nakayama et al. |
| 2009/0238449 | A1 | 9/2009 | Zhang et al. |
| 2009/0250632 | A1 | 10/2009 | Kempe et al. |
| 2010/0141750 | A1* | 6/2010 | Osawa .......... G02B 21/367 348/79 |
| 2010/0296104 | A1* | 11/2010 | Abramovich ...... G01B 11/2527 356/601 |
| 2011/0036996 | A1 | 2/2011 | Wolleschensky et al. |
| 2012/0223214 | A1 | 9/2012 | Lee et al. |
| 2012/0256101 | A1 | 10/2012 | Ye et al. |
| 2012/0264132 | A1 | 10/2012 | Ismagilov et al. |
| 2013/0210682 | A1 | 8/2013 | Eltoukhy et al. |
| 2013/0250407 | A1 | 9/2013 | Schaffer et al. |
| 2014/0001341 | A1 | 1/2014 | Hassibi et al. |
| 2014/0196550 | A1 | 7/2014 | Chernomorsky et al. |
| 2014/0274746 | A1 | 9/2014 | Khurana et al. |
| 2014/0313576 | A1* | 10/2014 | Uhl .......... G02B 21/06 359/385 |
| 2014/0320957 | A1 | 10/2014 | Ouchi et al. |
| 2015/0079596 | A1 | 3/2015 | Eltoukhy et al. |
| 2015/0093306 | A1 | 4/2015 | Thorne et al. |
| 2015/0213598 | A1 | 7/2015 | Madabhushi et al. |
| 2015/0266022 | A1 | 9/2015 | Eltoukhy et al. |
| 2015/0275289 | A1 | 10/2015 | Otwinowski |
| 2016/0047749 | A1 | 2/2016 | Lee et al. |
| 2016/0124208 | A1* | 5/2016 | Best .......... G02B 21/0076 359/363 |
| 2016/0273034 | A1 | 9/2016 | Lundquist et al. |
| 2016/0356715 | A1 | 12/2016 | Zhong et al. |
| 2017/0107562 | A1 | 4/2017 | Rothberg et al. |
| 2017/0145498 | A1 | 5/2017 | Saxena et al. |
| 2017/0349944 | A1 | 12/2017 | Rothberg et al. |
| 2018/0180547 | A1 | 6/2018 | Cao et al. |
| 2019/0212294 | A1 | 7/2019 | Dehlinger et al. |
| 2019/0212295 | A1 | 7/2019 | Dehlinger et al. |
| 2020/0302297 | A1 | 9/2020 | Jaganathan et al. |
| 2020/0364496 | A1 | 11/2020 | Kostem |

FOREIGN PATENT DOCUMENTS

| | | | |
|---|---|---|---|
| CN | 103534627 | | 1/2014 |
| CN | 105980832 | | 9/2016 |
| DE | 102016007839 | A1 | 12/2017 |
| JP | 2002-540423 | | 11/2002 |
| JP | 2005-055219 | | 3/2005 |
| JP | 2005080181 | | 3/2005 |
| JP | 2007-199397 | | 8/2007 |
| JP | 2010-510511 | | 4/2010 |
| JP | 2013-108626 | | 6/2013 |
| JP | 2014-508969 | | 4/2014 |
| JP | 5900515 | | 3/2016 |
| JP | 2020524990 | | 8/2020 |
| JP | 2020525760 | A | 8/2020 |
| KR | 20040001590 | | 1/2004 |
| KR | 1020140081208 | | 7/2014 |
| KR | 1020170135834 | | 12/2017 |
| RU | 2014113330 | | 10/2015 |
| WO | 2007/123744 | A2 | 11/2007 |
| WO | WO-2008140758 | A1 * | 11/2008 ......... G01N 21/6452 |
| WO | 2009/100830 | | 8/2009 |
| WO | 2008/072597 | | 3/2010 |
| WO | 2012/031234 | A2 | 3/2012 |
| WO | 2013/035009 | | 3/2013 |
| WO | 2013108626 | | 7/2013 |
| WO | 2015/084985 | | 6/2015 |
| WO | 2016/168996 | A1 | 10/2016 |
| WO | 2017/045107 | | 3/2017 |
| WO | 2017184997 | A1 | 10/2017 |
| WO | 2019136290 | A1 | 7/2019 |
| WO | 2019136376 | A1 | 7/2019 |

OTHER PUBLICATIONS

Coskun, A., et al., Lensless wide-field fluorescent imaging on a chip using compressive decoding of sparse objects, Optics express, 18 (10), May 5, 2010, 10510-10523.
Frohn, J., et al., "Three-dimensional resolution enhancement in fluorescence microscopy by harmonic excitation" Optics Letters 26 (11), 828-830, 2001.
Frohn, J., et al., "True optical resolution beyond the Rayleigh limit achieved by standing wave illumination" PNAS 97 (13), 7232-7236, 2000.
Krishnamurthi, V., et al., "Image processing in 3D standing-wave fluorescence microscopy" Three-Dimensional Microscopy: Image Acquisition and Processing III vol. 2655, International Society for Optics and Photonics, 18-25, Apr. 10, 1996.
Giraud, et al., "Fluorescence lifetime biosensing with DNA microarrays and a CMOS-SPAD imager", Biomedical Optics Express, 1(5), 1302-1308, 2010.
"Illumina CMOS Chip and One-Channel SBS Chemistry", Illumina, Inc., 4 pages, 2018.

(56) References Cited

OTHER PUBLICATIONS

Wang, et al., "An adaptive decorrelation method removes Illumina DNA base-calling errors caused by crosstalk between adjacent clusters", Nature Science Reports, 1-11, 2017.

* cited by examiner

FIG. 14B

ND ILLUMINATION

CROSS-REFERENCE TO RELATED APPLICATIONS

The present application claims priority to U.S. Provisional Patent Application No. 62/614,690 filed on Jan. 8, 2018 and entitled "Multiplexing of an Active Sensor Detector using Structured Illumination," and Dutch Patent Application No. N2020621 filed on Mar. 20, 2018 and entitled "Multiplexing of an Active Sensor Detector using Structured Illumination." The entire contents of each of the aforementioned applications are hereby incorporated herein by reference.

BACKGROUND

In microscopic imaging, the lateral resolution of a microscope is generally limited by the diffraction limit determined by the wavelength of the light source and a numerical aperture of the microscope's objective lens. For instance, one limitation of active sensor imaging technology such as complementary metal-oxide-semiconductor (CMOS) imaging technology is that the ultimate pitch, and thus data density of information is limited by the pitch of the sensor system, which may be between about 1 and 1.75 um in high-end systems. This limitation will likely persist as processing of smaller pixels is complicated by fabrication constraints.

In some traditional microscopic imaging systems that utilize a charge-coupled device (CCD) imaging sensor, spatially structured (i.e., patterned) light may be used to image a sample to increase the lateral resolution of the microscope by a factor of two or more. In such systems, during imaging of the sample, three images of fringe patterns of the sample may be acquired at various pattern phases (e.g., 0°, 120°, and 240°), so that each location on the sample is exposed to a range of illumination intensities, with the procedure repeated by rotating the pattern orientation about the optical axis (e.g., 60° and 120°). The captured images (e.g., nine images) may be assembled into a single image having an extended spatial frequency bandwidth, which may be retransformed into real space to generate an image having a higher resolution that one captured by a conventional microscope. In these traditional systems, detection of molecules by structured illumination microscopy relies on recollecting the excitation light (typically with the same objective used to excite) and reimaging the emission signal onto a CCD camera.

SUMMARY

Implementations described herein are directed to a structured illumination imaging system that utilizes an image sensor (e.g., an active pixel sensor) in an active plane of a patterned sample to increase image resolution. The imaged sample may be patterned and/or aligned over an image sensor such that each pixel of the image sensor has a respective plurality of features formed and/or mounted above it.

In one implementation, a system includes: a light emitter to emit light; an optical element to diffract light emitted by the light emitter to project a plurality of fringes on a plane of a sample comprising patterned features; and an image sensor to collect light emitted by the features of the sample. In this implementation, the image sensor includes a plurality of pixels, the sample is to be aligned over the image sensor such that a plurality of the patterned features is aligned over each of a respective one of the plurality of pixels along a first axis, and the projected plurality of fringes is shaped to illuminate one of the features of each of the respective pluralities of the patterned features. In various implementations, the projected plurality of fringes has a fringe width that is at least about the same or greater than a dimension of the regularly patterned features, and the fringe width is less than the pitch of each of the plurality of pixels. For example, the dimension of the regularly patterned features may be a diameter of a circular feature, a length of a side of a square feature, a length of the longer side or shorter side of a rectangular feature, a diameter of an elliptical feature along its major axis or minor axis, or the longest dimension of an irregularly-shaped object along one axis of the object (e.g., x or y axis).

In implementations, the image sensor is an active pixel image sensor such as a complementary metal-oxide-semiconductor (CMOS) image sensor.

In two-dimensional structured illumination imaging implementations, the system further includes: a second optical element to diffract light emitted by the light emitter to project a second plurality of fringes on the plane of the sample, where the second plurality of fringes is orthogonally oriented relative to the first plurality of fringes. In such implementations, the sample may be aligned over the image sensor such that a second plurality of the patterned features is positioned over a respective one of each of the plurality of pixels, where each of the second plurality of the patterned features are aligned along a second axis orthogonal to the first axis, where the projected second plurality of fringes is shaped to illuminate one of each of the second plurality of the patterned features.

In two-dimensional structural illumination imaging implementations, the optical elements to diffract light may include: a horizontal transmissive diffraction grating to project the first plurality of fringes and a vertical transmissive diffraction grating to project the second plurality of fringes. In some particular implementations, four patterned features are positioned over a respective one of the plurality of pixels, wherein the four patterned features are arranged in a square grid over the pixel. In some particular implementations, three patterned features are positioned over a respective one of the plurality of pixels, wherein the three patterned features are arranged in an L-shape over the pixel.

In some implementations, each of the plurality of pixels is a rectangular pixel, where the features of the sample are aligned over each rectangular pixel in a linear array.

In some implementations, each of the plurality of pixels is a square pixel, and each of the pluralities of features comprises two features having an aspect ratio of about 2:1. In some implementations, each of the plurality of pixels is a square pixel, and each of the pluralities of features comprises three features having an aspect ratio of about 3:1.

In implementations, the sample may be formed over the image sensor. For example, the sample may be lithographically patterned over an active pixel image sensor.

In particular implementations, each of the features is a reaction recess comprising a reaction site formed over a light guide of one of the plurality of pixels.

In some implementations, the image sensor includes first and second alignment rows or columns of pixels, wherein the first and second alignment rows or columns are to spatially align the plurality of fringes with the sample and image sensor. In these implementations, only one feature of the sample may be positioned over each of the plurality of pixels of the first and second alignment rows or columns.

In one implementation, a method includes: projecting a first plurality of fringes on a plane of a sample comprising patterned features, wherein the sample is aligned over an image sensor such that a first plurality of the patterned features is positioned over a respective one of the plurality of pixels, where each of the pluralities of the patterned features are aligned along a first axis over the pixel; illuminating, with the first plurality of fringes, a first feature of each of the first pluralities of the patterned features; capturing a first image of the first feature of each of the first pluralities of the patterned features; phase shifting the first plurality of fringes to illuminate a second feature of each of the first pluralities of the patterned features; and capturing a second image of the second feature of each of the first pluralities of the patterned features.

In some implementations of this method, the projected plurality of fringes has a fringe width that is at least about the same or greater than a dimension of the regularly patterned features, and the fringe width is less than the pitch of each of the plurality of pixels. In some implementations, the sample is formed over the image sensor, and the image sensor is an active pixel sensor.

In particular implementations of this method, the first plurality of fringes is positioned to illuminate only one feature over each of the plurality of pixels during the steps of capturing the first image and the second image.

In some implementations, the method further includes: projecting a second plurality of fringes on the plane of the sample, where the second plurality of fringes is orthogonally oriented relative to the first plurality of fringes, where the sample is aligned over the image sensor such that a second plurality of the patterned features is positioned over a respective one of the plurality of pixels, where each of the second plurality of the patterned features is aligned along a second axis orthogonal to the first axis; illuminating, with the second plurality of fringes, a third feature of each of the second pluralities of the patterned features; capturing a third image of the third feature of each of the second pluralities of the patterned features; phase shifting the second plurality of fringes to illuminate a fourth feature of each of the second pluralities of the patterned features; and capturing a fourth image of the second feature of each of the second pluralities of the patterned features.

In one implementation, a biosensor includes: a sensor array comprising a plurality of pixels; and a reaction array of reaction recesses having corresponding reaction sites, where the reaction array is patterned over the sensor array such that a plurality of the reaction recesses is patterned over a respective one of the plurality of pixels; and an optical assembly to project a plurality of fringes on a plane of the reaction array, where the projected plurality of fringes is shaped to illuminate one of the reaction recesses patterned over each of the plurality of pixels. In this implementation, the projected plurality of fringes may have a fringe width that is at least about the same or greater than a dimension of the reaction recesses, and the fringe width may be less than a pitch of each of the plurality of pixels, and the fringe width may be at least about the same as the pitch of each of the plurality of pixels. In some implementations, the biosensor further includes: one or more optical elements to phase shift the plurality of fringes by a fraction of the pitch of each of the plurality of pixels.

Other features and aspects of the disclosed technology will become apparent from the following detailed description, taken in conjunction with the accompanying drawings, which illustrate, by way of example, the features in accordance with implementations of the disclosed technology. The summary is not intended to limit the scope of any inventions described herein, which are defined by the claims and equivalents.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The present disclosure, in accordance with one or more implementations, is described in detail with reference to the following figures. The figures are provided for purposes of illustration only and merely depict example implementations. Furthermore, it should be noted that for clarity and ease of illustration, the elements in the figures have not necessarily been drawn to scale.

Some of the figures included herein illustrate various implementations of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

FIG. 14B illustrates how the five images captured using the method of FIG. 14A may be decoded to estimate the signal intensities of each of four features patterned over a pixel.

Figure 1A:
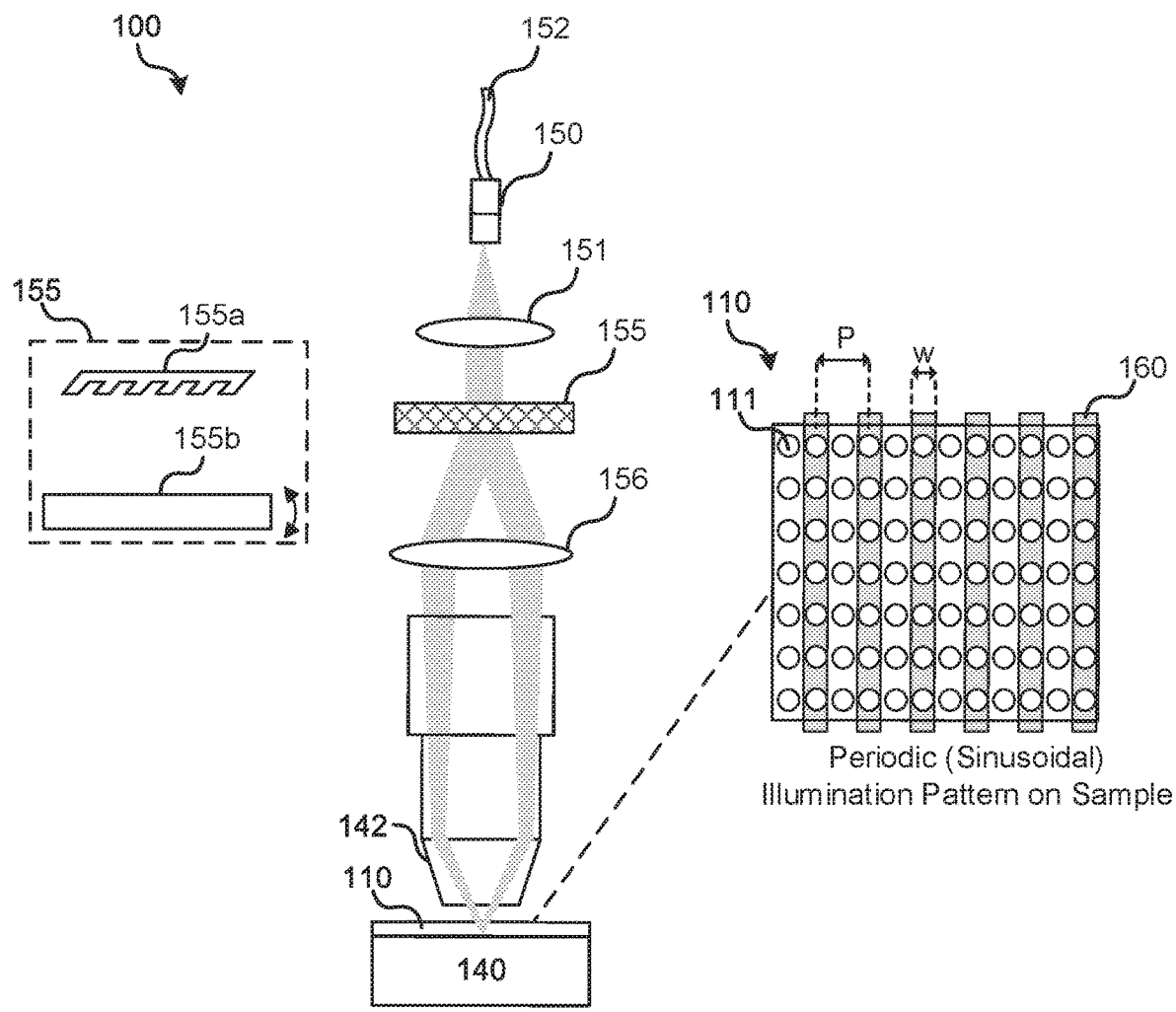
FIG. 1A shows an example structured illumination imaging system in which an image sensor is in the same plane as a patterned sample, in accordance with implementations.

The figures are not exhaustive and do not limit the present disclosure to the precise form disclosed.

DETAILED DESCRIPTION

As used herein to refer to a sample, the term "spot" or "feature" is intended to mean a point or area in a pattern that can be distinguished from other points or areas according to relative location. An individual spot can include one or more molecules of a particular type. For example, a spot can include a single target nucleic acid molecule having a particular sequence or a spot can include several nucleic acid molecules having the same sequence (and/or complementary sequence, thereof).

As used herein, the term "xy plane" is intended to mean a 2 dimensional area defined by straight line axes x and y in a Cartesian coordinate system. When used in reference to a detector and an object observed by the detector, the area can be further specified as being orthogonal to the direction of observation between the detector and object being detected.

As used herein, the term "z coordinate" is intended to mean information that specifies the location of a point, line or area along an axis that is orthogonal to an xy plane. In particular implementations, the z axis is orthogonal to an area of an object that is observed by a detector. For example, the direction of focus for an optical system may be specified along the z axis.

As used herein, the term "optically coupled" is intended to refer to one element being adapted to impart light to another element directly or indirectly.

As used herein, a "designated reaction" includes a change in at least one of a chemical, electrical, physical, or optical property (or quality) of an analyte-of-interest. In particular implementations, the designated reaction is a positive binding event (e.g., incorporation of a fluorescently labeled biomolecule with the analyte-of-interest). More generally, the designated reaction may be a chemical transformation, chemical change, or chemical interaction. The designated reaction may also be a change in electrical properties.

As used herein, a "reaction component" or "reactant" includes any substance that may be used to obtain a designated reaction. For example, reaction components include reagents, enzymes, samples, other biomolecules, and buffer solutions. The reaction components may be delivered to a reaction site in a solution and/or immobilized at a reaction site. The reaction components may interact directly or indirectly with another substance, such as the analyte-of-interest.

As used herein, the term "reaction site" is a localized region where a designated reaction may occur. A reaction site may include support surfaces of a substrate where a substance may be immobilized thereon. For example, a reaction site may include a planar surface in a channel of a flow cell that has a colony of nucleic acids thereon. Typically, but not always, the nucleic acids in the colony have the same sequence, being for example, clonal copies of a single stranded or double stranded template. However, in some implementations a reaction site may contain only a single nucleic acid molecule, for example, in a single stranded or double stranded form. Furthermore, a plurality of reaction sites may be randomly distributed along the support surface or arranged in a predetermined manner (e.g., side-by-side in a matrix, such as in microarrays). A reaction site can also include a reaction chamber that at least partially defines a spatial region or volume configured to compartmentalize the designated reaction. As used herein, the term "reaction chamber" includes a spatial region that is in fluid communication with a flow channel. The reaction chamber may be at least partially separated from the surrounding environment or other spatial regions. For example, a plurality of reaction chambers may be separated from each other by shared walls. As a more specific example, the reaction chamber may include a cavity defined by interior surfaces of a well and have an opening or aperture so that the cavity may be in fluid communication with a flow channel.

As used herein, the term "adjacent" when used with respect to two reaction sites means no other reaction site is located between the two reaction sites. The term "adjacent" may have a similar meaning when used with respect to adjacent detection paths and adjacent light sensors (e.g., adjacent light sensors have no other light sensor therebetween).

As used herein, a "substance" includes items or solids, such as capture beads, as well as biological or chemical substances. As used herein, a "biological or chemical substance" includes biomolecules, samples-of-interest, analytes-of-interest, and other chemical compound(s). A biological or chemical substance may be used to detect, identify, or analyze other chemical compound(s), or function as intermediaries to study or analyze other chemical compound(s). In particular implementations, the biological or chemical substances include a biomolecule. As used herein, a "biomolecule" includes at least one of a biopolymer, nucleoside, nucleic acid, polynucleotide, oligonucleotide, protein, enzyme, polypeptide, antibody, antigen, ligand, receptor, polysaccharide, carbohydrate, polyphosphate, cell, tissue, organism, or fragment thereof or any other biologically active chemical compound(s) such as analogs or mimetics of the aforementioned species.

As used herein, a "reaction component" or "reactant" includes any substance that may be used to obtain a designated reaction. For example, reaction components include reagents, enzymes, samples, other biomolecules, and buffer solutions. The reaction components are typically delivered to a reaction site in a solution and/or immobilized at a reaction site. The reaction components may interact directly or indirectly with another substance, such as the analyte-of-interest.

As used herein, the term "reaction site" is a localized region where a designated reaction may occur. A reaction site may include support surfaces of a substrate where a substance may be immobilized thereon. For example, a reaction site may include an at least substantially planar surface in a channel of a flow cell that has a colony of nucleic acids thereon. In some instances, the nucleic acids in the colony have the same sequence, being for example, clonal copies of a single stranded or double stranded template. However, in some implementations a reaction site may contain only a single nucleic acid molecule, for example, in a single stranded or double stranded form. Furthermore, a plurality of reaction sites may be randomly distributed along the support surface or arranged in a predetermined manner (e.g., side-by-side in a matrix, such as in microarrays). A reaction site can also include a reaction chamber that at least partially defines a spatial region or volume configured to compartmentalize the designated reaction. As used herein, the term "reaction chamber" includes a spatial region that is in fluid communication with a flow channel. The reaction chamber may be at least partially separated from the surrounding environment or other spatial regions. For example, a plurality of reaction chambers may be separated from each other by shared walls. As a more specific example, the reaction chamber may include a cavity defined by interior surfaces of a well and have an opening or aperture so that the cavity may be in fluid communication with a flow channel.

In a further example, a biological or chemical substance or a biomolecule includes an enzyme or reagent used in a coupled reaction to detect the product of another reaction such as an enzyme or reagent used to detect pyrophosphate in a pyrosequencing reaction. Biomolecules, samples, and biological or chemical substances may be naturally occurring or synthetic and may be suspended in a solution or mixture within a spatial region. Biomolecules, samples, and biological or chemical substances may also be bound to a solid phase or gel material. Biomolecules, samples, and biological or chemical substances may also include a pharmaceutical composition. In some cases, biomolecules, samples, and biological or chemical substances of interest may be referred to as targets, probes, or analytes.

As used herein, a "biosensor" includes a structure having a plurality of reaction sites that is configured to detect designated reactions that occur at or proximate to the reaction sites. A biosensor may include a solid-state imaging device (e.g., CMOS or CCD imager) and, optionally, a flow cell mounted thereto. The flow cell may include at least one flow channel that is in fluid communication with the reaction sites. As one specific example, the biosensor is configured to fluidicly and/or electrically couple to a bioassay system. The bioassay system may deliver reactants to the reaction sites according to a predetermined protocol (e.g., sequencing-by-synthesis) and perform a plurality of imaging events. For example, the bioassay system may direct solutions to flow along the reaction sites. At least one of the solutions may include four types of nucleotides having the same or different fluorescent labels. The nucleotides may bind to corresponding oligonucleotides located at the reaction sites. The bioassay system may then illuminate the reaction sites using an excitation light source (e.g., solid-state light sources, such as light-emitting diodes or LEDs). The excitation light may have a predetermined wavelength or wavelengths, including a range of wavelengths. The excited fluorescent labels provide emission signals that may be detected by the light sensors.

In alternative implementations, the biosensor may include electrodes or other types of sensors configured to detect other identifiable properties. For example, the sensors may be configured to detect a change in ion concentration. In another example, the sensors may be configured to detect the ion current flow across a membrane As used herein, a "cartridge" includes a structure that is configured to hold a biosensor. In some implementations, the cartridge may include additional features, such as the light source (e.g., LEDs) that are configured to provide excitation light to the reactions sites of the biosensor. The cartridge may also include a fluidic storage system (e.g., storage for reagents, sample, and buffer) and a fluidic control system (e.g., pumps, valves, and the like) for fluidically transporting reaction components, sample, and the like to the reaction sites. For example, after the biosensor is prepared or manufactured, the biosensor may be coupled to a housing or container of the cartridge. In some implementations, the biosensors and the cartridges may be self-contained, disposable units. However, other implementations may include an assembly with removable parts that allow a user to access an interior of the biosensor or cartridge for maintenance or replacement of components or samples. The biosensor and the cartridge may be removably coupled or engaged to larger bioassay systems, such as a sequencing system, that conducts controlled reactions therein.

As used herein, when the terms "removably" and "coupled" (or "engaged") are used together to describe a relationship between the biosensor (or cartridge) and a system receptacle or interface of a bioassay system, the term is intended to mean that a connection between the biosensor (or cartridge) and the system receptacle is readily separable without destroying or damaging the system receptacle and/or the biosensor (or cartridge). Components are readily separable when the components may be separated from each other without undue effort or a significant amount of time spent in separating the components. For example, the biosensor (or cartridge) may be removably coupled or engaged to the system receptacle in an electrical manner such that the mating contacts of the bioassay system are not destroyed or damaged. The biosensor (or cartridge) may also be removably coupled or engaged to the system receptacle in a mechanical manner such that the features that hold the biosensor (or cartridge) are not destroyed or damaged. The biosensor (or cartridge) may also be removably coupled or engaged to the system receptacle in a fluidic manner such that the ports of the system receptacle are not destroyed or damaged. The system receptacle or a component is not considered to be destroyed or damaged if, for example, only a simple adjustment to the component (e.g., realignment) or a simple replacement (e.g., replacing a nozzle) is required.

As used herein, the term "fluid communication" or "fluidicly coupled" refers to two spatial regions being connected together such that a liquid or gas may flow between the two spatial regions. For example, a microfluidic channel may be in fluid communication with a reaction chamber such that a fluid may flow freely into the reaction chamber from the microfluidic channel. The terms "in fluid communication" or "fluidicly coupled" allow for two spatial regions being in fluid communication through one or more valves, restrictors, or other fluidic components that are configured to control or regulate a flow of fluid through a system.

As used herein, the term "immobilized," when used with respect to a biomolecule or biological or chemical substance, includes at least substantially attaching the biomolecule or biological or chemical substance at a molecular level to a surface. For example, a biomolecule or biological or chemical substance may be immobilized to a surface of the substrate material using adsorption techniques including non-covalent interactions (e.g., electrostatic forces, van der Waals, and dehydration of hydrophobic interfaces) and covalent binding techniques where functional groups or linkers facilitate attaching the biomolecules to the surface. Immobilizing biomolecules or biological or chemical substances to a surface of a substrate material may be based upon the properties of the substrate surface, the liquid medium carrying the biomolecule or biological or chemical substance, and the properties of the biomolecules or biological or chemical substances themselves. In some cases, a substrate surface may be functionalized (e.g., chemically or physically modified) to facilitate immobilizing the biomolecules (or biological or chemical substances) to the substrate surface. The substrate surface may be first modified to have functional groups bound to the surface. The functional groups may then bind to biomolecules or biological or chemical substances to immobilize them thereon.

As noted above, one limitation of current CMOS imaging technology is that that the ultimate pitch, and thus data density of information is limited by the pitch of pixels of the sensor system. Although structured illumination has been utilized in some CCD imaging systems to increase lateral resolution, detection of molecules in such systems rely on recollecting the excitation light with the same objective used to excite and reimaging the emission signal onto a CCD camera. In such systems, each optic that the recollected light passes through decreases the signal and can introduce aberrations that are detrimental to imaging resolution and performance.

Implementations described herein address these problems through the use of a structured illumination imaging system that utilizes an image sensor (e.g., an active pixel sensor) in an active plane of a sample. In accordance with implementations described herein, the imaged sample may be patterned and/or aligned over the image sensor assembly such that each light sensor (e.g., pixel) of the image sensor has a respective plurality of features formed and/or mounted above it. During imaging, each pixel of the image sensor may be spatially multiplexed using structured illumination such that only a subset (e.g., one) of the features aligned over the pixel are illuminated with structured light during an image read. For example, in particular implementations that utilize a biosensor imaging system having multiple clusters or nanowells formed over each pixel, a single cluster (or nanowell) per sensor pixel may be spatially multiplexed to achieve subpixel resolution, which can be achieved by using a structured illumination system to image one of the clusters or nanowells over each pixel at a time.

Implementations described herein may achieve several benefits over preexisting imaging systems. First, unlike in preexisting structured illumination imaging systems that recollect light through the optical illumination path (e.g., through the objective), the illumination path in implementations described herein is only for excitation without concern about emission wavelengths and optics. Accordingly, filters and optics in the source can be optimized for the excitation only. Second, in traditional imaging systems, the light from an object at the camera is diffraction limited and spans multiple pixels on the imaging camera, but with the active sensor at the sample plane subpixel resolution can be achieved as described herein. Further, in implementations where the image sensor is an active pixel image sensor (e.g., pixels have photodetectors and amplifiers) such as a CMOS sensor, additional benefits such as increased signal gain and reduced cost of the imaging assembly may be gained. These and other benefits of the technology disclosed herein will be appreciated from the foregoing description.

Figure 1B:
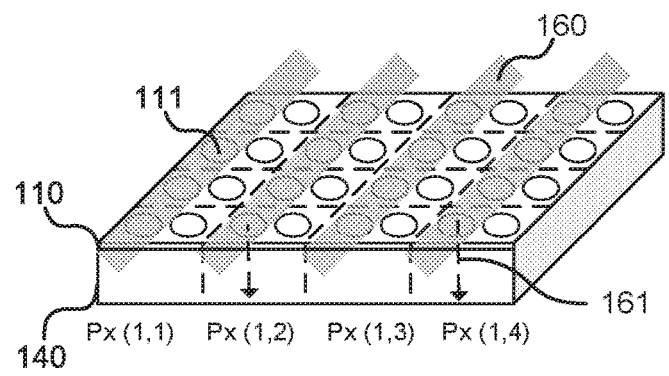
FIG. 1B shows an assembly including a sample patterned over an image sensor such that two features are formed along one dimension over each pixel of the image sensor.

Before describing various implementations of the systems and methods disclosed herein, it is useful to describe an example environment with which the technology disclosed herein can be implemented. One such example environment is illustrated by FIGS. 1A-1B, which show a structured illumination imaging system 100 in which an image sensor 140 is in the same plane as a patterned sample 110 that is illuminated with spatially structured light. For example, system 100 may be a structured illumination fluorescence microscopy system that utilizes spatially structured excitation light to image a patterned biological sample.

In example system 100, a light emitter 150 is configured to output a light beam that is collimated by collimator 151 (e.g., a collimation lens). The collimated beam is shaped into a structured (patterned) beam 160 by beam structuring optical assembly 155 and directed through objective lens 142 onto a patterned sample 110 including a plurality of features 111. Any light emitted by patterned sample 110 is collected by image sensor assembly 140, which is positioned directly below sample 110 in this example. For instance, in the case of a fluorescent sample 110, illuminated features 111 of the sample may fluoresce in response to the structured excitation light, and the resultant light 161 emitted by features 111 may be collected by photosites (e.g., pixels) of image sensor assembly 140 to detect fluorescence. For instance, as illustrated by FIG. 1B, pixels (1,2) and (1,4) of image sensor assembly 140 may collect light 161 that is emitted by the features 111 of the sample that are positioned or patterned over the sensor.

As illustrated by FIG. 1B, sample 110 may be formed over image sensor assembly 140 (e.g., using a variety of different lithographic techniques). Forming sample 110 over assembly 140 may provide the advantage of ensuring that patterned features 111 of the sample 110 remain aligned relative to particular photosites (e.g., pixels) of image sensor assembly 140 during imaging. In such implementations, a layer (not shown) may provide isolation between sample 110 and image sensor assembly 140 (e.g., to shield the image sensor assembly from a fluidic environment of the sample). In other implementations, sample 110 may be mounted and aligned over image sensor assembly 140.

Sample 110 is patterned and aligned with image sensor assembly 140 such that each light sensor (e.g., pixel) of image sensor 140 has a respective plurality of features 111 formed and/or mounted above it. As illustrated in the example of FIG. 1B, sample 110 is patterned over image sensor assembly 140 such that two features 111 are formed along one dimension over each pixel of the pixel array of image sensor assembly 140. For example, each feature 111 may have a diameter (e.g., 500 nm) that is less than half the pitch (e.g., 1 um) of each pixel. In other implementations, three, four, or even more features 111 may be formed along one dimension (e.g., as a linear array) or along two dimensions (e.g., as a square grid array) over each pixel of image sensor assembly 140. For example, four features may be formed in a square over each pixel. As another example, three features may be formed in a linear array over each pixel.

During each image reading, light emitted by emitter 150 is structured by structuring optical assembly 155 to project fringes 160 having a pitch P (center to center spacing between fringes) and width w such that one of features 111 corresponding to each pixel is at least substantially illuminated. For example, the pitch P may be at least substantially the same as the pitch of the pixels of the image sensor (e.g., a 1 um pitch for square 1 um×1 um pixels) and the width w may be at least substantially the same as or slightly greater than a dimension of features 111 (e.g., about a 500 nm or greater width for sites having a diameter of 500 nm). In particular implementations, the width w may be greater than the diameter of features 111 and less than the diameter of features 111 plus the spacing between adjacent features 111. In implementations, the dimension of the regularly patterned features that the fringe width w is at least substantially the same as or slightly greater than may be a diameter of a circular feature, a length of a side of a square feature, a length of the longer side or shorter side of a rectangular feature, a diameter of an elliptical feature along its major axis or minor axis, or the longest dimension of an irregularly shaped feature along one axis of the feature (e.g., x or y axis).

Figure 2:
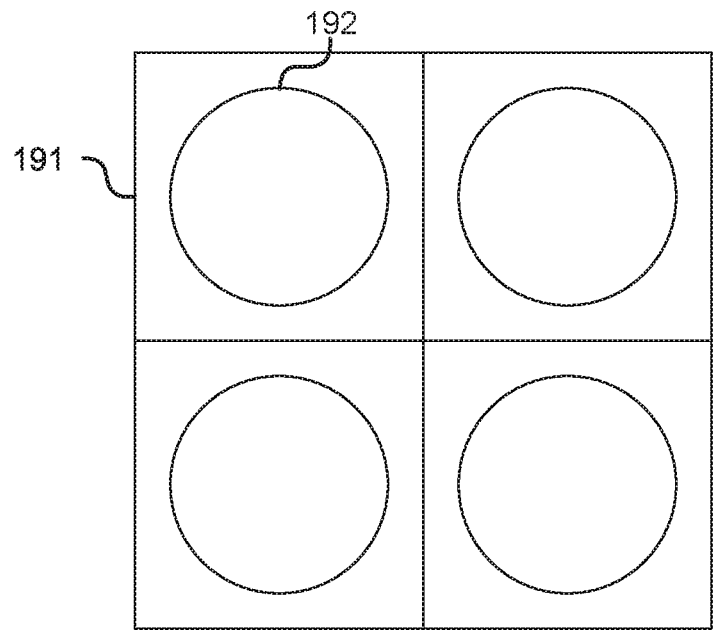
FIG. 2 illustrates a configuration of an imaging system assembly including a sample patterned over an image sensor such that a single feature is formed over each pixel of the image sensor.

In the example of FIG. 1B, where two features are formed over each pixel, the features on the left side of each pixel are illuminated by the structured light pattern of fringes 160, resulting in signal from half of the features. During another image reading, the features on the right side of pixel may be illuminated by phase shifting the structured light pattern to the right, resulting in signal from the other half of the features. As such, by spatially multiplexing data readouts from each pixel using structured illumination it may be possible to achieve double the data density per pixel (i.e., double the feature density) with the configuration of FIGS. 1A-1B, as contrasted with a system that places one feature 192 above each pixel 191, as illustrated by FIG. 2. In such cases, the information content available in the system is not limited by the pixel density but rather the feature density. In some implementations, further described below, by patterning additional features above each pixel (e.g., three, four, or more), it may be possible to triple or even quadruple the data density of each pixel.

As illustrated, sample 110 is patterned with a rectangular array of ordered spots or features 111 that may be simultaneously imaged during an imaging run. Although a rectangular array is illustrated in this example, in other implementations the sample may be patterned using a hexagonal array or some other array pattern that may be imaged using a structured illumination pattern with fringes 160. For ease of illustration, sample 100 is illustrated as having tens of features 111. However, it should be appreciated that sample 100 may have thousands, millions, or billions of features 111 that are imaged. Moreover, in some instances, sample 100 may be a multi-plane sample comprising multiple planes (perpendicular to focusing direction) of features 111 that are sampled during an imaging run. In a particular implementation, sample 100 may be a flow cell patterned with millions or billions of wells that are divided into one or more lanes. In this particular implementation, each well of the flow cell may contain biological material that is sequenced using sequencing-by-synthesis.

Image sensor assembly 140 may include one or more active pixel sensors such as a complementary metal oxide (CMOS) image sensor or a charge-coupled device (CCD) image sensor. Although the pixels of the image sensor may be square pixels having a 1:1 aspect ratio, in other implementations, further described below, the pixels may be rectangularly shaped and have other aspect ratios (e.g., a 2:1 aspect ratio, a 3:1 aspect ratio, a 4:1 aspect ratio, a 3:2 aspect ratio, etc.) In particular implementations, the image sensor assembly may be implemented as a biosensor image sensor assembly, further discussed below.

In system 100, light emitter 150 may be an incoherent light emitter (e.g., emit light beams output by one or more excitation diodes), or a coherent light emitter such as emitter of light output by one or more lasers or laser diodes. As illustrated in the example of system 100, light emitter 150 includes an optical fiber 152 for guiding an optical beam to be output. However, other configurations of a light emitter 150 may be used. In implementations utilizing structured illumination in a multi-channel imaging system (e.g., a multi-channel fluorescence microscope utilizing multiple wavelengths of light), optical fiber 152 may optically couple to a plurality of different light sources (not shown), each light source emitting light of a different wavelength. Although system 100 is illustrated as having a single light emitter 150, in some implementations multiple light emitters 150 may be included.

Light structuring optical assembly 155 in various implementations, includes one or more optical elements (e.g., diffraction gratings) to generate a sinusoidal pattern of diffracted light (e.g., fringes) that is projected onto the surface of sample 110. For example, one-dimensional or two-dimensional transmissive or reflective diffraction gratings may be used to generated a structured light beam having regularly spaced fringes or stripes 160 that are projected on the surface of sample 160. In some implementations, light structuring optical assembly 155 is configured to generate structured light patterns oriented along a single direction (e.g., only vertical fringes or horizontal fringes 160).

In some implementations, light structuring optical assembly 155 may be configured to generate structured light patterns oriented along two at least substantially orthogonal directions (e.g., both vertical and horizontal directions). In such implementations, assembly 155 may include a rotation stage for rotating a grating to change the orientation of the pattern (e.g., from horizontal to vertical or vice versa) projected on sample 110. Alternatively, assembly 155 may include two orthogonally oriented diffraction gratings that are switched along the illumination path to generate different orientations of illumination patterns (e.g., a vertical fringe pattern and horizontal fringe pattern) on sample 110. Alternatively, assembly 155 may include a two-dimensional diffraction grating and filter for blocking diffracted light in one of two dimensions to project a structured light beam oriented along one direction.

Light structuring optically assembly 155 may also include one or more optical phase modulators for translating (i.e., phase shifting) the projected pattern of light 110 along the plane of the sample 110. For example, light structuring optical assembly 155 may include one or more linear translation stages, optical wedges, optical windows, or other optical element to change the optical path length of the diffracted light. For instance, in the example illustrated by FIG. 1A, the optical phase modulator may be used to shift fringes 160 such that they illuminate one of two sets of columns of features 111.

As illustrated in the particular example of FIG. 1A, assembly 155 includes a one-dimensional transmissive diffraction grating 155a to generate the sinusoidal pattern of diffracted light and rotating window 155b to change the phase of the diffracted light.

During each imaging cycle, imaging system 100 utilizes light structuring optical assembly 155 to acquire a plurality of images at various phases, displaced laterally along the sample plane (e.g., along x-y plane), with this procedure repeated one or more times by rotating the pattern orientation about the optical axis (i.e., with respect to the x-y plane of the sample).

In some implementations, system 100 may include a fluid delivery module or device to direct the flow of reagents (e.g., fluorescently labeled nucleotides, buffers, enzymes, cleavage reagents, etc.) to (and through) a sample container containing sample 110 and a waste valve. For example, in the case of a system to analyze a large number of different nucleic acid sequences, the sample container can include a sample substrate on which nucleic acids to be sequenced are bound, attached or associated. The substrate can include any inert substrate or matrix to which nucleic acids can be attached, such as for example glass surfaces, plastic surfaces, latex, dextran, polystyrene surfaces, polypropylene surfaces, polyacrylamide gels, gold surfaces, and silicon wafers. System 100 also may include a temperature station actuator and heater/cooler that can optionally regulate the temperature of conditions of the fluids within the sample container.

In some implementations, sample 110 and image sensor 140 can be mounted on a sample stage (not shown) to provide movement and alignment of the sample 110 relative to the objective lens 142. The sample stage can have one or more actuators to allow it to move in any of three dimensions. For example, in terms of the Cartesian coordinate system, actuators can be provided to allow the stage to move in the X, Y and Z directions relative to the objective lens. This can allow one or more sample locations on sample 110 to be positioned in optical alignment with objective lens 142. Alternatively, sample 110 may be fixed during imaging.

Although not illustrated, a controller can be provided to control the operation of structured illumination imaging system 100, including synchronizing the various optical components of system 100. The controller can be implemented to control aspects of system operation such as, for example, configuration of light structuring optical assembly 155 (e.g., selection and/or phase shifting of diffraction gratings), focusing, stage movement (if any), and imaging operations. In various implementations, the controller can be implemented using hardware, algorithms (e.g., machine executable instructions), or a combination of the foregoing. For example, in some implementations the controller can include one or more CPUs or processors with associated memory. As another example, the controller can comprise hardware or other circuitry to control the operation, such as a computer processor and a non-transitory computer readable medium with machine-readable instructions stored thereon. For example, this circuitry can include one or more of the following: field programmable gate array (FPGA), application specific integrated circuit (ASIC), programmable logic device (PLD), complex programmable logic device (CPLD), a programmable logic array (PLA), programmable array logic (PAL) or other similar processing device or circuitry. As yet another example, the controller can comprise a combination of this circuitry with one or more processors.

Figure 3:
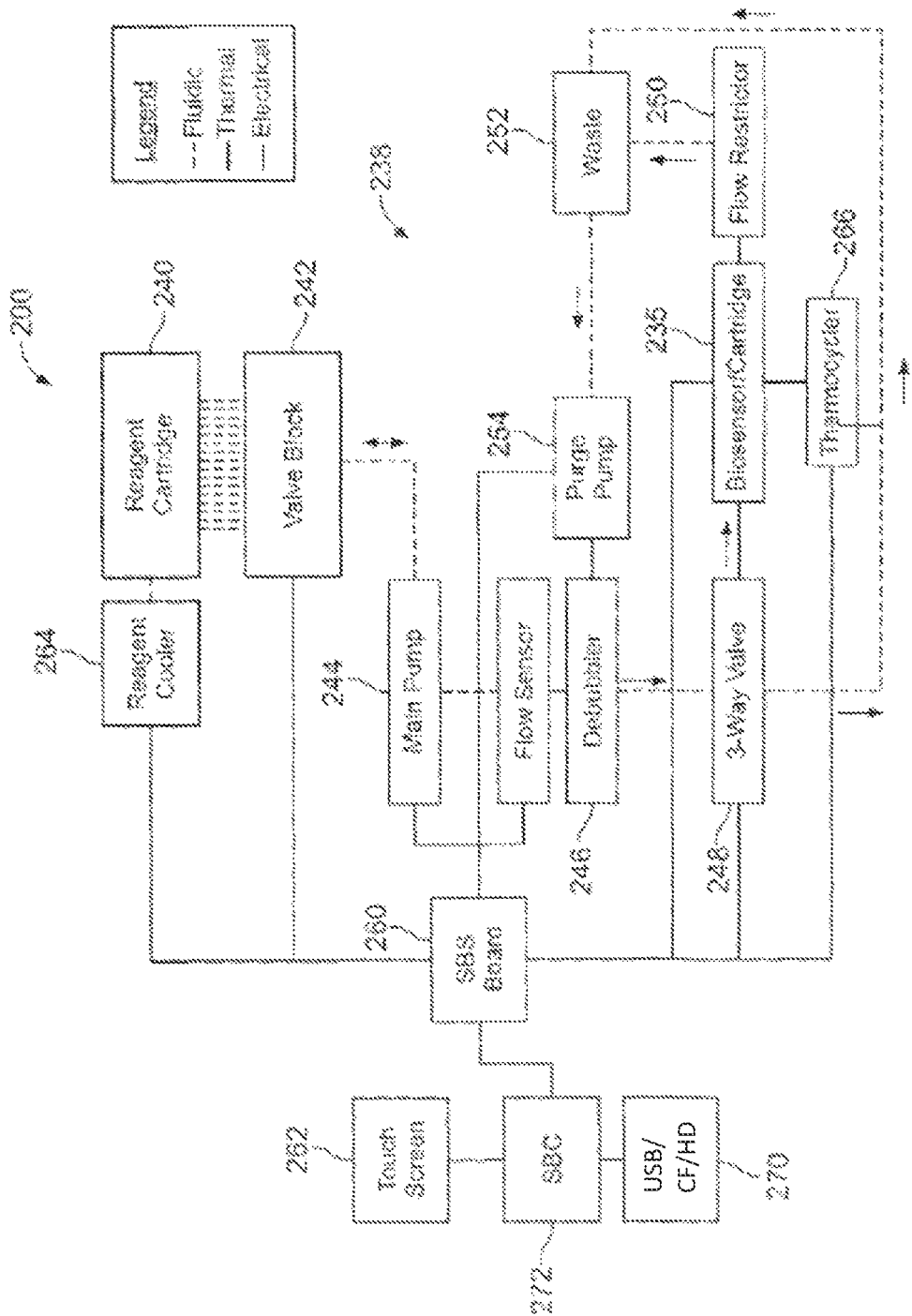
FIG. 3 is a block diagram of an example workstation for biological or chemical analysis in accordance with one implementation.

FIG. 3 is a block diagram of an example workstation 200 for biological or chemical analysis in accordance with one implementation. The workstation 200 may have a fluidic control system, that is fluidicly coupled to a biosensor (or cartridge) 235 through a fluid network 238. The fluid network 238 may include a reagent cartridge 240, a valve block 242, a main pump 244, a debubbler 246, a 3-way valve 248, a flow restrictor 250, a waste removal system 252, and a purge pump 254. In particular implementations, most of the components or all of the components described above are within a common workstation housing (not shown). Although not shown, the workstation 200 may also include a structured illumination system that is configured to provide structured excitation light (e.g., as a periodic illumination pattern of fringes) to a plurality of reaction sites. For example, the structured illumination system may include one or more light emitters and light structuring optics (e.g., diffraction gratings, phase modulators, etc.) as described above with reference to FIG. 1.

A flow of fluid is indicated by arrows along the fluid network 238. For example, reagent solutions may be removed from the reagent cartridge 240 and flow through the valve block 242. The valve block 242 may facilitate creating a zero-dead volume of the fluid flowing to the cartridge 235 from the reagent cartridge 240. The valve block 242 can select or permit one or more liquids within the reagent cartridge 240 to flow through the fluid network 238. For example, the valve block 242 can include solenoid valves that have a compact arrangement. Each solenoid valve can control the flow of a fluid from a single reservoir bag. In some implementations, the valve block 242 can permit two or more different liquids to flow into the fluid network 238 at the same time thereby mixing the two or more different liquids. After leaving the valve block 242, the fluid may flow through the main pump 244 and to the debubbler 246. The debubbler 246 is configured to remove unwanted gases that have entered or been generated within the fluid network 238.

From the debubbler 246, fluid may flow to the 3-way valve 248 where the fluid is either directed to the cartridge 235 or bypassed to the waste removal system 252. A flow of the fluid within the cartridge 235 may be at least partially controlled by the flow restrictor 250 located downstream from the cartridge 235. Furthermore, the flow restrictor 250 and the main pump 244 may coordinate with each other to control the flow of fluid across reaction sites and/or control the pressure within the fluid network 238. Fluid may flow through the cartridge 235 and onto the waste removal system 252. Optionally, fluid may flow through the purge pump 254 and into, for example, a waste reservoir bag within the reagent cartridge 240.

The workstation 200 may include a temperature control system that is configured to regulate or control a thermal environment of the different components and sub-systems of the workstation 200. The temperature control system can include a reagent cooler 264 that is configured to control the temperature requirements of various fluids used by the workstation 200, and a thermocycler 266 that is configured to control the temperature of a cartridge 235. The thermocycler 266 can include a thermal element (not shown) that interfaces with the cartridge.

Furthermore, the workstation 200 may include a system controller or sequencing-by-synthesis (SBS) board 260 that may communicate with the various components and sub-systems of the workstation 200 as well as the cartridge 235 to perform a sequencing by synthesis process. Furthermore, the SBS board 260 may communicate with remote systems to, for example, store data or receive commands from the remote systems. The workstation 200 may also include a touch screen user interface 262 that is operatively coupled to the SBS board 260 through a single-board computer (SBC) 272. The workstation 200 may also include one or more user accessible data communication ports and/or drives. For example a workstation 200 may include one or more universal serial bus (USB) connections for computer peripherals, such as a flash or jump drive, a compact-flash (CF) drive and/or a hard drive (HD) 270 for storing user data in addition to other software.

Figure 4:
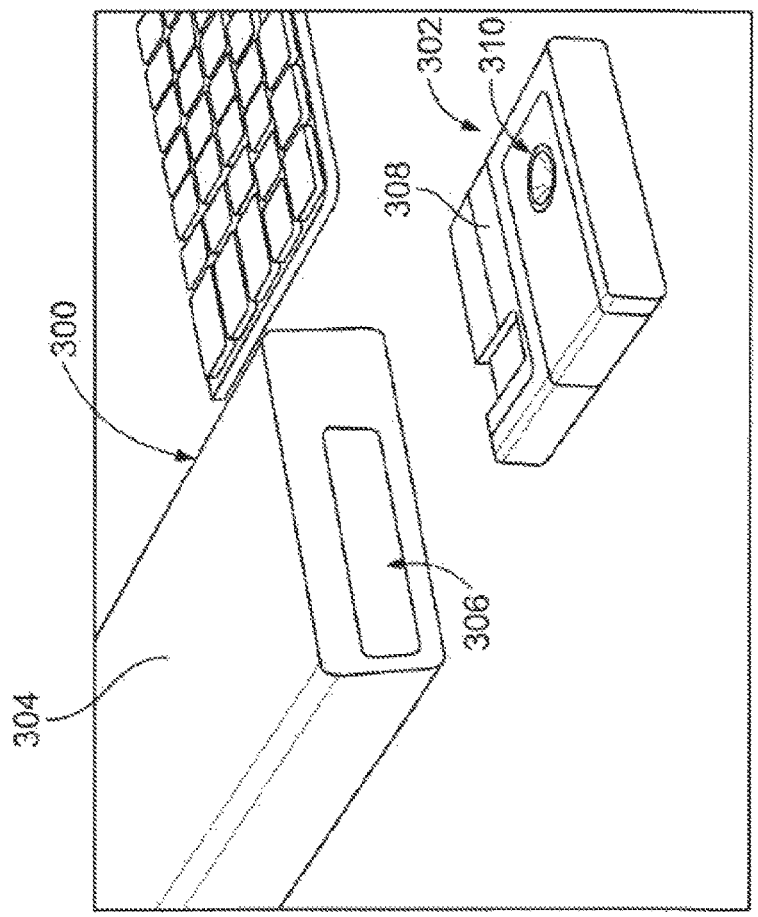
FIG. 4 is a perspective view of a workstation and a cartridge that may include one or more biosensors as described in implementations.

FIG. 4 is a perspective view of a workstation 300 and a cartridge 302 that may include one or more biosensors (not shown) as described in implementations. The workstation 300 may include similar components as described above with respect to the workstation 200 and may operate in a similar manner. The workstation 300 may include a workstation housing 304 and a system receptacle 306 that is configured to receive and engage the cartridge 302. The system receptacle may at least one of fluidically and electrically engage the cartridge 302. The workstation housing 304 may hold, for example, a system controller, a fluid storage system, a fluidic control system, and a temperature control system. In FIG. 4, the workstation 300 does not include a user interface or display that is coupled to the workstation housing 304. However, a user interface may be communicatively coupled to the housing 304 (and the components/systems therein) through a communication link. Thus, the user interface and the workstation 300 may be remotely located with respect to each other. Together, the user interface and the workstation 300 (or a plurality of workstations) may constitute a bioassay system.

As shown, the cartridge 302 includes a cartridge housing 308 having at least one port 310 that provides access to an interior of the cartridge housing 308. For example, a solution that is configured to be used in the cartridge 302 during the controlled reactions may be inserted through the port 310 by a technician or by the workstation 300. The system receptacle 306 and the cartridge 302 may be sized and shaped relative to each other such that the cartridge 302 may be inserted into a receptacle cavity (not shown) of the system receptacle 306.

Figure 5:
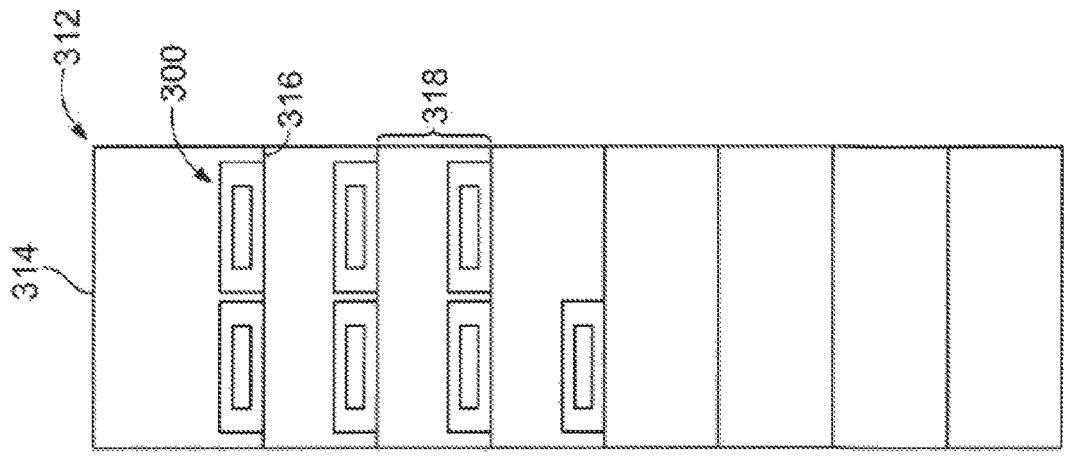
FIG. 5 is a front view of a rack assembly having a cabinet or carriage with a plurality of the workstations loaded thereon.

FIG. 5 is a front view of a rack assembly 312 having a cabinet or carriage 314 with a plurality of the workstations 300 loaded thereon. The cabinet 314 may include one or more shelves 316 that define one or more reception spaces 318 configured to receive one or more workstations 300. Although not shown, the workstations 300 may be communicatively coupled to a communication network that permits a user to control operation of the workstations 300. In some implementations, a bioassay system includes a plurality of workstations, such as the workstations 300, and a single user interface configured to control operation of the multiple workstations.

Figure 6:
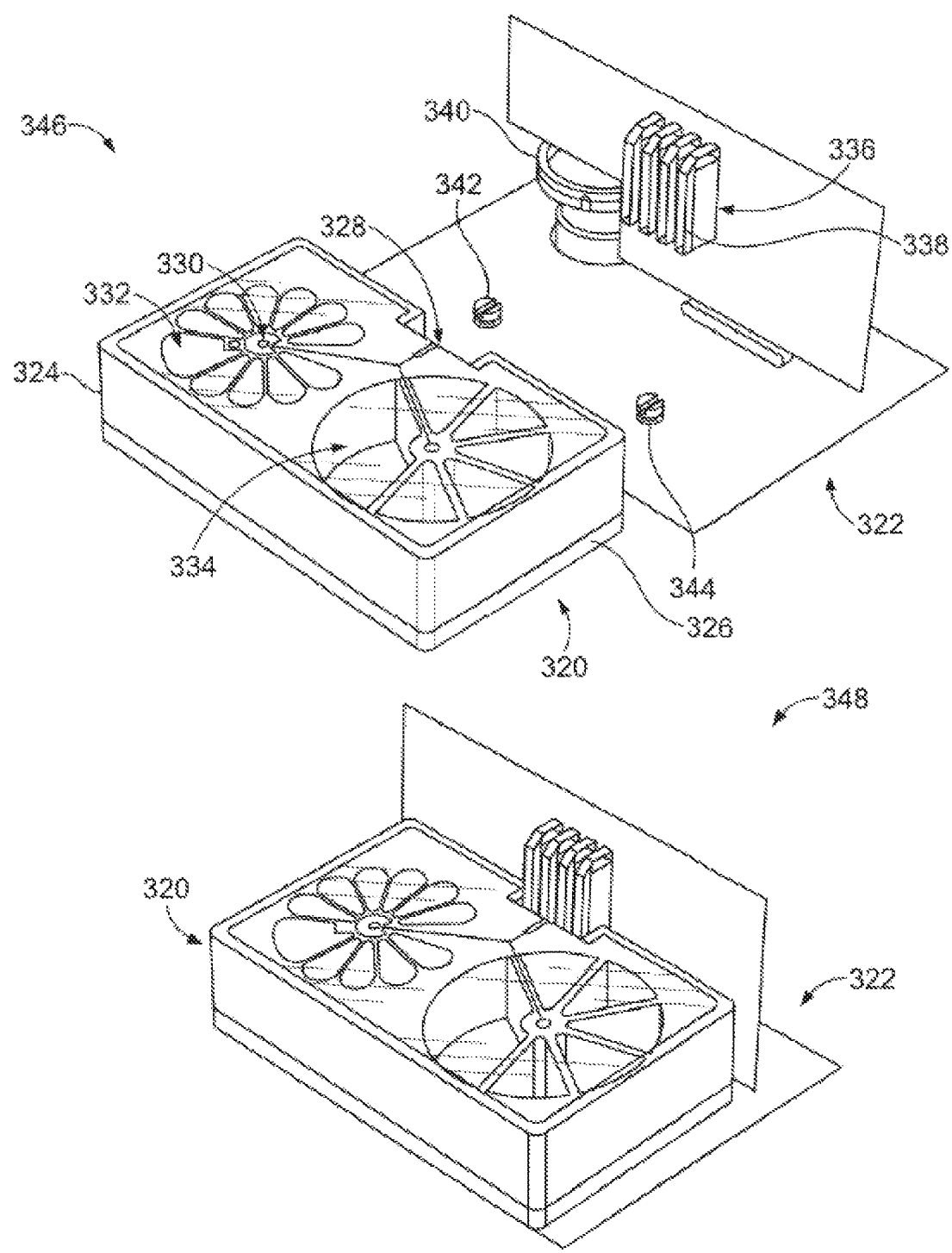
FIG. 6 illustrates various features of the cartridge of FIG. 4 in accordance with one implementation.

FIG. 6 illustrates various features of the cartridge 302 (FIG. 4) in accordance with one implementation. As shown, the cartridge 302 may include a sample assembly 320, and the system receptacle 306 may include a light assembly 322. Stage 346 shown in FIG. 6 represents the spatial relationship between the first and second sub-assemblies 320 and 322 when they are separate from each other. At stage 348, the first and second sub-assemblies 320 and 322 are joined together. The cartridge housing 308 (FIG. 4) may enclose the joined first and second sub-assemblies 320 and 322.

In the illustrated implementation, the first sub-assembly 320 includes a base 326 and a reaction-component body 324 that is mounted onto the base 326. Although not shown, one or more biosensors may be mounted to the base 326 in a recess 328 that is defined, at least in part, by the reaction-component body 324 and the base 326. For example, at least four biosensors may be mounted to the base 326. In some implementations, the base 326 is a printed circuit board having circuitry that enables communication between the different components of the cartridge and the workstation 300 (FIG. 4). For example, the reaction-component body 324 may include a rotary valve 330 and reagent reservoirs 332 that are fluidically coupled to the rotary valve 330. The reaction-component body 324 may also include additional reservoirs 334.

The second sub-assembly 322 includes a light assembly 336 that includes a plurality of structured light directing channels 338. Each structured light directing channel 338 is optically coupled to a structured light source (not shown), such as a light-emitting diode (LED) and diffraction grating as discussed above. The light source(s) are configured to provide a periodic illumination pattern of excitation light that is directed by the light directing channels 338 onto the biosensors. In alternative implementations, the cartridge may not include a structured light source(s). In such implementations, the structured light source(s) may be located in the workstation 300. When the cartridge is inserted into the system receptacle 306 (FIG. 4), the cartridge 302 may align with the structured light source(s) so that the biosensors may be illuminated with structured light. In other implementations, light directing channels 338 may be configured to generate structured light (e.g., by using one or more transmissive diffraction gratings).

Also shown in FIG. 6, the second sub-assembly 322 includes a cartridge pump 340 that is fluidically coupled to ports 342 and 344. When the first and second sub-assemblies 320 and 322 are joined together, the port 342 is coupled to the rotary valve 330 and the port 344 is coupled to the other reservoirs 334. The cartridge pump 340 may be activated to direct reaction components from the reservoirs 332 and/or 334 to the biosensors according to a designated protocol.

Figure 7:
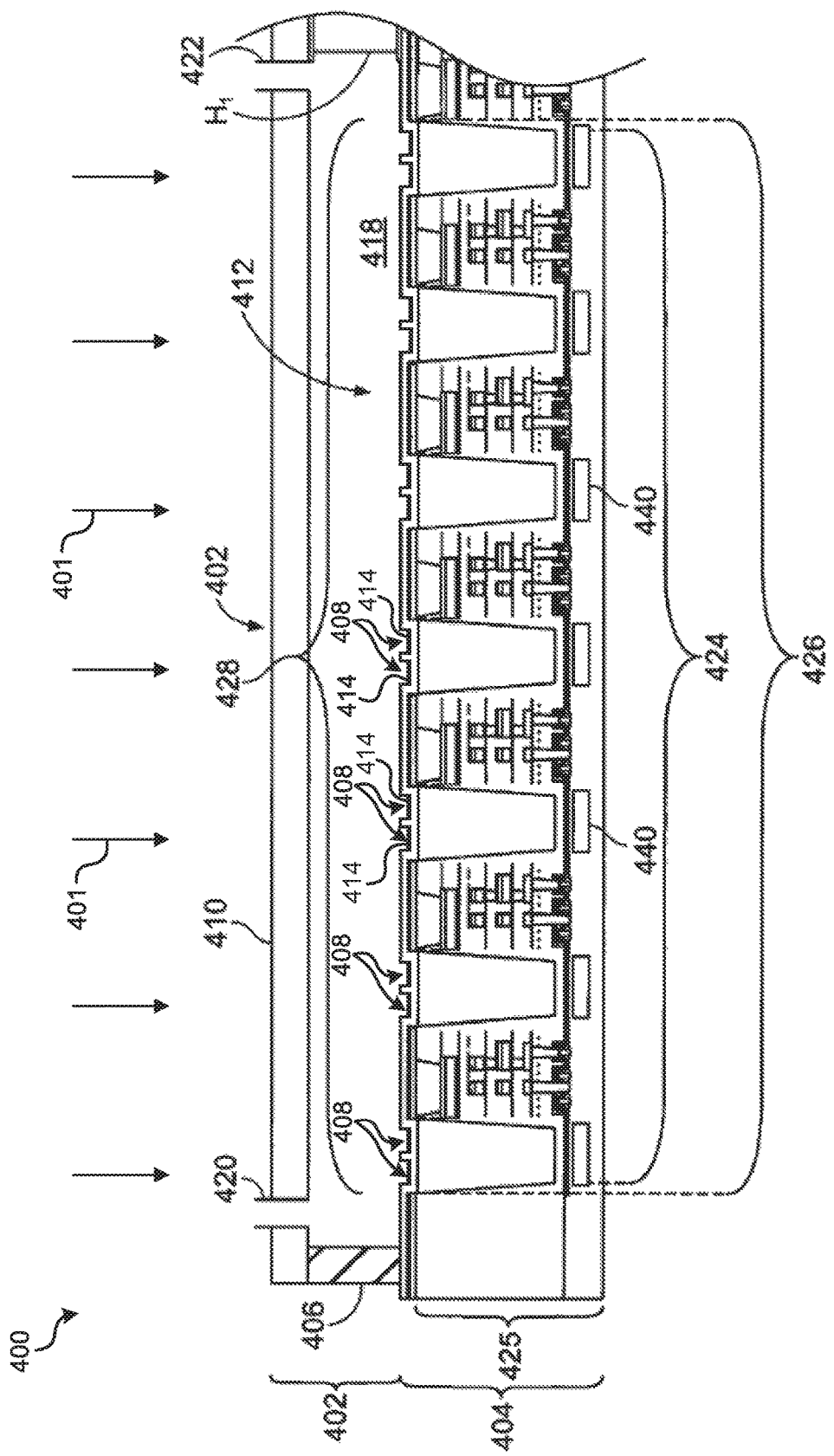
FIG. 7 illustrates a cross-section of a portion of an example biosensor formed in accordance with one implementation.

FIG. 7 illustrates a cross-section of a portion of an example biosensor 400 formed in accordance with one implementation. The biosensor 400 may be used in, for example, the cartridge 302 (FIG. 4). As shown, the biosensor 400 may include a flow cell 402 that is coupled directly or indirectly to a detection device 404. The flow cell 402 may be mounted to the detection device 404. In the illustrated implementation, the flow cell 402 is affixed directly to the detection device 404 through one or more securing mechanisms (e.g., adhesive, bond, fasteners, and the like). In some implementations, the flow cell 402 may be removably coupled to the detection device 404.

In the illustrated implementation, the detection device 404 includes a device base 425. In particular implementations, the device base 425 includes a plurality of stacked layers (e.g., silicon layer, dielectric layer, metal-dielectric layers, etc.). The device base 425 may include a sensor array 424 of light sensors 440, a guide array 426 of light guides 462, and a reaction array 428 of reaction recesses 408 that have corresponding reaction sites 414.

In this implementation, the components are arranged such that each light sensor 440 aligns with two reaction recesses 408. As such, each light sensor 440 is configured to image at least two different reaction sites 414, where each reaction site corresponds to a respective recess 408. This may be achieved using structured excitation light 401 that is patterned such that only one reaction recess formed over of each light sensor 440 is at least substantially illuminated during an image read. For instance, in the example of FIG.

7, a plurality of periodic light fringes may illuminate the left side above each light sensor 440 (left reaction sites) during one image read and the right side above each light sensor 440 (right reaction sites) during another image read. In this configuration, by spatially multiplexing the readouts, each light sensor 440 may separately receive photons from each of two reaction sites.

In certain implementations, the components are arranged such that each light sensor 440 aligns with a single light guide 462 and two reaction sites 414. However, in other implementations, a single light sensor 440 may receive photons through more than one light guide 462 and/or from more than two reaction sites 414. For example, each recess 408 may have multiple reaction sites and/or more than two recesses 408 may be aligned over each light sensor 440. As used herein, a single light sensor 440 may include one pixel or more than one pixel.

Moreover, it is noted that the term "array" or "sub-array" does not necessarily include each and every item of a certain type that the detection device may have. For example, the sensor array 424 may not include each and every light sensor in the detection device 404. Instead, the detection device 404 may include other light sensors (e.g., other array(s) of light sensors). As another example, the guide array 426 may not include each and every light guide of the detection device. Instead, there may be other light guides that are configured differently than the light guides 462 or that have different relationships with other elements of the detection device 404. As such, unless explicitly recited otherwise, the term "array" may or may not include all such items of the detection device.

In the illustrated implementation, the flow cell 402 includes a sidewall 406 and a flow cover 410 that is supported by the sidewall 406 and other sidewalls (not shown). The sidewalls are coupled to the detector surface 412 and extend between the flow cover 410 and the detector surface 412. In some implementations, the sidewalls are formed from a curable adhesive layer that bonds the flow cover 410 to the detection device 404.

The flow cell 402 is sized and shaped so that a flow channel 418 exists between the flow cover 410 and the detection device 404. As shown, the flow channel 418 may include a height $H_1$. By way of example only, the height $H_1$ may be between about 50-400 μm (microns) or, in one example, about 80-200 μm. In the illustrated implementation, the height $H_1$ is about 100 pin. The flow cover 410 may include a material that is transparent to structured excitation light 401 propagating from an exterior of the biosensor 400 into the flow channel 418. As shown in FIG. 7, the structured excitation light 401 approaches the flow cover 410 at an orthogonal angle. However, this is only for illustrative purposes as the excitation light 401 may approach the flow cover 410 from different angles.

Also shown, the flow cover 410 may include inlet and outlet ports 420, 422 that are configured to fluidically engage other ports (not shown). For example, the other ports may be from the cartridge 302 (FIG. 4) or the workstation 300 (FIG. 4). The flow channel 418 is sized and shaped to direct a fluid along the detector surface 412. The height $H_1$ and other dimensions of the flow channel 418 may be configured to maintain an at least substantially even flow of a fluid along the detector surface 412. The dimensions of the flow channel 418 may also be configured to control bubble formation.

The sidewalls 406 and the flow cover 410 may be separate components that are coupled to each other. In other implementations, the sidewalls 406 and the flow cover 410 may be integrally formed such that the sidewalls 406 and the flow cover 410 are formed from a continuous piece of material. By way of example, the flow cover 410 (or the flow cell 402) may comprise a transparent material, such as glass or plastic. The flow cover 410 may constitute an at least substantially rectangular block having a planar exterior surface and a planar inner surface that defines the flow channel 418. The block may be mounted onto the sidewalls 406. Alternatively, the flow cell 402 may be etched to define the flow cover 410 and the sidewalls 406. For example, a recess may be etched into the transparent material. When the etched material is mounted to the detection device 404, the recess may become the flow channel 418.

The detection device 404 has a detector surface 412 that may be functionalized (e.g., chemically or physically modified in a suitable manner for conducting designated reactions). For example, the detector surface 412 may be functionalized and may include a plurality of reaction sites 414 having one or more biomolecules immobilized thereto. The detector surface 412 has an array of reaction recesses or open-sided reaction chambers 408. Each of the reaction recesses 408 may include one or more of the reaction sites 414. The reaction recesses 408 may be defined by, for example, an indent or change in depth along the detector surface 412. In other implementations, the detector surface 412 may be at least substantially planar. In such implementations, two reaction sites may be aligned over each sensor 440 on the planar detector surface.

As shown in FIG. 7, the reaction sites 414 may be distributed in a pattern along the detector surface 412. For instance, the reactions sites 414 may be located in rows and columns along the detector surface 412 in a manner that is similar to a microarray. However, it is understood that various patterns of reaction sites may be used. The reaction sites may include biological or chemical substances that emit light signals. For example, the biological or chemical substances of the reactions sites may generate light emissions in response to the structured excitation light 401. In particular implementations, the reaction sites 414 include clusters or colonies of biomolecules (e.g., oligonucleotides) that are immobilized on the detector surface 412.

Figure 8:
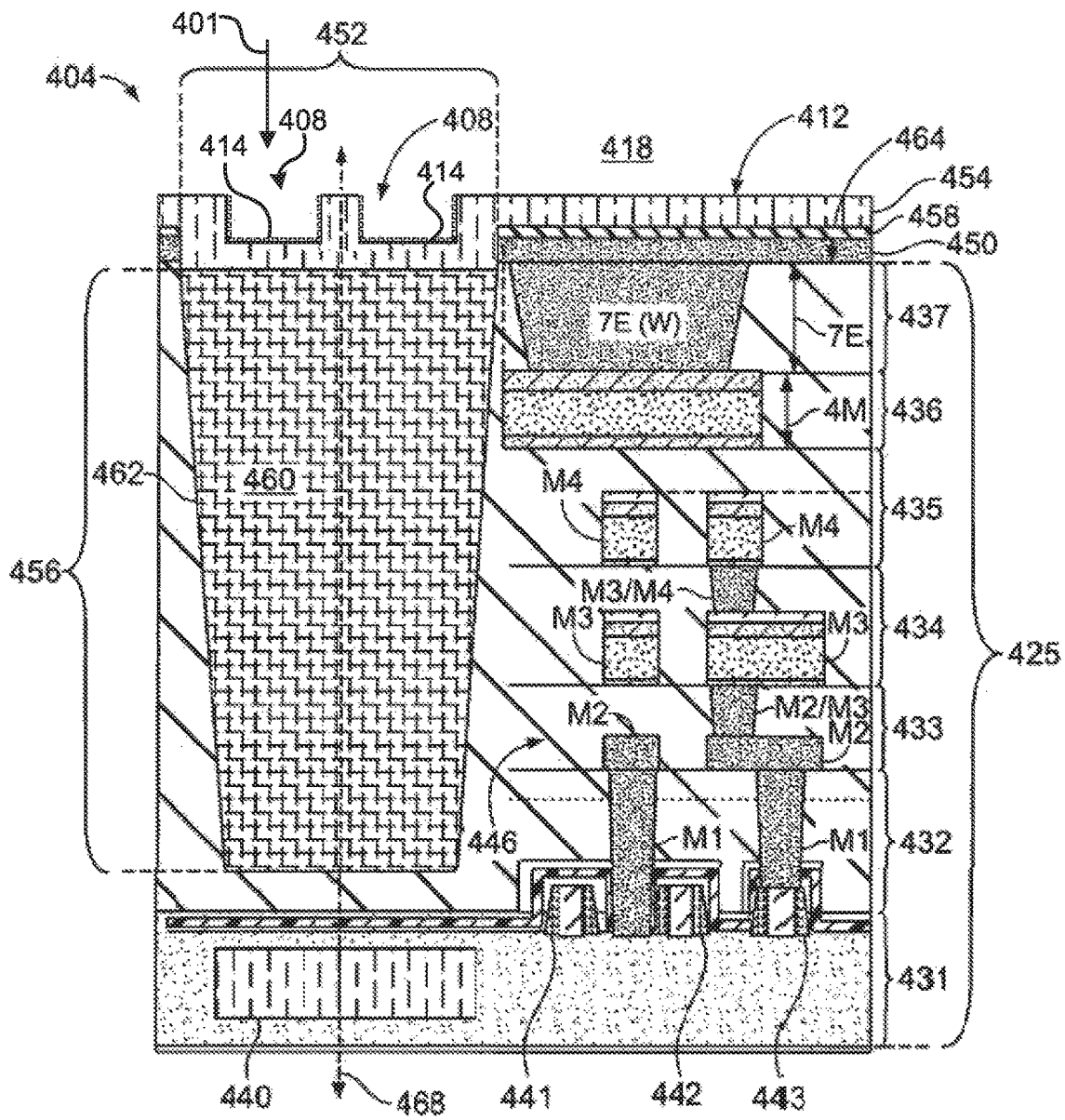
FIG. 8 is an enlarged cross-section of the detection device of FIG. 7 showing various features in greater detail.

FIG. 8 is an enlarged cross-section of the detection device 404 showing various features in greater detail. More specifically, FIG. 8 shows a single light sensor 440, a single light guide 462 for directing light emissions toward the light sensor 440, and associated circuitry 446 for transmitting signals based on the light emissions (e.g., photons) detected by the light sensor 440. It is understood that the other light sensors 440 of the sensor array 424 (FIG. 7) and associated components may be configured in an identical or similar manner. It is also understood, however, the detection device 404 is not required to be manufactured identically or uniformly throughout. Instead, one or more light sensors 440 and/or associated components may be manufactured differently or have different relationships with respect to one another.

The circuitry 446 may include interconnected conductive elements (e.g., conductors, traces, vias, interconnects, etc.) that are capable of conducting electrical current, such as the transmission of data signals that are based on detected photons. For example, in some implementations, the circuitry 446 may be similar to or include a microcircuit arrangement. The detection device 404 and/or the device base 425 may comprise an integrated circuit having a planar array of the light sensors 440. The circuitry 446 formed within the detection device 425 may be configured for at least one of signal amplification, digitization, storage, and processing. The circuitry may collect and analyze the detected light emissions and generate data signals for communicating detection data to a bioassay system. The circuitry 446 may also perform additional analog and/or digital signal processing in the detection device 404.

The device base 425 may be manufactured using integrated circuit manufacturing processes, such as processes used to manufacture complementary-metal-oxide semiconductors (CMOSs). For example, the device base 425 may include a plurality of stacked layers 431-437 including a sensor layer or base 431, which is a silicon layer or wafer in the illustrated implementation. The sensor layer 431 may include the light sensor 440 and gates 441-443 that are formed with the sensor layer 431. The gates 441-443 are electrically coupled to the light sensor 440. When the detection device 404 is fully formed as shown in FIGS. 7 and 8, the light sensor 440 may be electrically coupled to the circuitry 446 through the gates 441-443.

As used herein, the term "layer" is not limited to a single continuous body of material unless otherwise noted. For example, the sensor layer 431 may include multiple sublayers that are different materials and/or may include coatings, adhesives, and the like. Furthermore, one or more of the layers (or sub-layers) may be modified (e.g., etched, deposited with material, etc.) to provide the features described herein.

In some implementations, each light sensor 440 has a detection area that is less than about 50 $\mu m^2$. In particular implementations, the detection area is less than about 10 $\mu m^2$. In more particular implementations, the detection area is about 1-2 $\mu m^2$. In such cases, the light sensor 440 may constitute a single pixel. An average read noise of each pixel in a light sensor 440 may be, for example, less than about 150 electrons. In more particular implementations, the read noise may be less than about 5 electrons. The resolution of the array of light sensors 440 may be greater than about 0.5 megapixels (Mpixels). In more specific implementations, the resolution may be greater than about 5 Mpixels and, in one example, greater than about 10 Mpixels.

The device layers also include a plurality of metal-dielectric layers 432-437, which layers are hereinafter referred to as substrate layers. In the illustrated implementation, each of the substrate layers 432-437 includes metallic elements (e.g., W (tungsten), Cu (copper), Al (aluminum), etc.) and dielectric material (e.g., $SiO_2$). Various metallic elements and dielectric material may be used, such as those suitable for integrated circuit manufacturing. However, in other implementations, one or more of the substrate layers 432-437 may include only dielectric material, such as one or more layers of $SiO_2$.

With respect to the specific implementation shown in FIG. 8, the first substrate layer 432 may include metallic elements referred to as M1 that are embedded within dielectric material (e.g., $SiO_2$). The metallic elements M1 comprise, for example, W (tungsten). The metallic elements M1 extend entirely through the substrate layer 432 in the illustrated implementation. The second substrate layer 433 includes metallic elements M2 and dielectric material as well as a metallic interconnects (M2/M3). The third substrate layer 434 includes metallic elements M3 and metal interconnects (M3/M4). The fourth substrate layer 435 also includes metallic elements M4. The device base 425 also includes fifth and sixth substrate layers 436, 437, which are described in greater detail below.

As shown, the metallic elements and interconnects are connected to each other to form at least a portion of the circuitry 446. In the illustrated implementation, the metallic elements M1, M2, M3, M4 include W (tungsten), Cu (copper), and/or aluminum (Al) and the metal interconnects M2/M3 and M3/M4 include W (tungsten), but it is understood that other materials and configurations may be used. It is also noted that the device base 425 and the detection device 404 shown in FIGS. 7 and 8 are for illustrative purposes only. For example, other implementations may include fewer or additional layers than those shown in FIGS. 7 and 8 and/or different configurations of metallic elements.

In some implementations, the detection device 404 includes a shield layer 450 that extends along an outer surface 464 of the device base 425. In the illustrated implementation, the shield layer 450 is deposited directly along the outer surface 464 of the substrate layer 437. However, an intervening layer may be disposed between the substrate layer 437 and the shield layer 450 in other implementations. The shield layer 450 may include a material that is configured to block, reflect, and/or significantly attenuate the light signals that are propagating from the flow channel 418. The light signals may be the excitation light 401 and/or the light emissions 466 (shown in FIG. 9). By way of example only, the shield layer 450 may comprise tungsten (W).

As shown in FIG. 8, the shield layer 450 includes an aperture or opening 452 therethrough. The shield layer 450 may include an array of such apertures 452. In some implementations, the shield layer 450 may extend continuously between adjacent apertures 452. As such, the light signals from the flow channel 418 may be blocked, reflected, and/or significantly attenuated to prevent detection of such light signals by the light sensors 440. However, in other implementations, the shield layer 450 does not extend continuously between the adjacent apertures 452 such then one or more openings other than the apertures 452 exits in the shield layer 450.

The detection device 404 may also include a passivation layer 454 that extends along the shield layer 450 and across the apertures 452. The shield layer 450 may extend over the apertures 452 thereby directly or indirectly covering the apertures 452. The shield layer 450 may be located between the passivation layer 454 and the device base 425. An adhesive or promoter layer 458 may be located therebetween to facilitate coupling the passivation and shield layers 454, 450. The passivation layer 454 may be configured to protect the device base 425 and the shield layer 450 from the fluidic environment of the flow channel 418.

In some cases, the passivation layer 454 may also be configured to provide a solid surface (i.e., the detector surface 412) that permits biomolecules or other analytes-of-interest to be immobilized thereon. For example, each of the reaction sites 414 may include a cluster of biomolecules that are immobilized to the detector surface 412 of the passivation layer 454. Thus, the passivation layer 454 may be formed from a material that permits the reaction sites 414 to be immobilized thereto. The passivation layer 454 may also comprise a material that is at least transparent to a desired fluorescent light. By way of example, the passivation layer 454 may include silicon nitride ($Si_3N_4$) and/or silica ($SiO_2$). However, other suitable material(s) may be used. In addition, the passivation layer 454 may be physically or chemically modified to facilitate immobilizing the biomolecules and/or to facilitate detection of the light emissions.

In the illustrated implementation, a portion of the passivation layer 454 extends along the shield layer 450 and a portion of the passivation layer 454 extends directly along filter material 460 of a light guide 462. The two reaction recesses 408 may be formed directly over the light guide 462. In some cases, prior to the passivation layer 454 being deposited along the shield layer 450 or adhesion layer 458, a base hole or cavity 456 may be formed within the device base 425. For example, the device base 425 may be etched to form an array of the base holes 456. In particular implementations, the base hole 456 is an elongated space that extends from proximate the aperture 452 toward the light sensor 440. The base hole may extend lengthwise along a central longitudinal axis 468. A three-dimensional shape of the base hole 456 may be at least substantially cylindrical or frustro-conical in some implementations such that a cross-section taken along a plane that extends into the page of FIG. 8 is at least substantially circular. The longitudinal axis 468 may extend through a geometric center of the cross-section. However, other geometries may be used in alternative implementations. For example, the cross-section may be at least substantially square-shaped or octagonal.

The filter material 460 may be deposited within the base hole 456 after the base hole 456 is formed. The filter material 460 may form (e.g., after curing) a light guide 462. The light guide 462 is configured to filter the excitation light 401 and permit the light emissions 466 to propagate therethrough toward the corresponding light sensor 440. The light guide 462 may be, for example, an organic absorption filter. By way of specific example only, the excitation light may be about 532 nm and the light emissions may be about 570 nm or more.

In some cases, the organic filter material may be incompatible with other materials of the biosensor. For example, organic filter material may have a coefficient of thermal expansion that causes the filter material to significantly expand. Alternatively or in addition to, the filter material may be unable to sufficiently adhere to certain layers, such as the shield layer (or other metal layers). Expansion of the filter material may cause mechanical stress on the layers that are adjacent to the filter material or structurally connected to the filter material. In some cases, the expansion may cause cracks or other unwanted features in the structure of the biosensor. As such, implementations set forth herein may limit the degree to which the filter material expands and/or the degree to which the filter material is in contact with other layers. For example, the filter material of different light guides may be isolated from each other by the passivation layer. In such implementations, the filter material may not contact the metal layer(s). Moreover, the passivation layer may resist expansion and/or permit some expansion while reducing generation of unwanted structural features (e.g., cracks).

The light guide 462 may be configured relative to surrounding material of the device base 425 (e.g., the dielectric material) to form a light-guiding structure. For example, the light guide 462 may have a refractive index of about 2.0 so that the light emissions are at least substantially reflected at an interface between the light guide 462 and the material of the device base 425. In certain implementations, the light guide 462 is configured such that the optical density (OD) or absorbance of the excitation light is at least about 4 OD. More specifically, the filter material may be selected and the light guide 462 may be dimensioned to achieve at least 4 OD. In more particular implementations, the light guide 462 may be configured to achieve at least about 5 OD or at least about 6 OD. Other features of the biosensor 400 may be configured to reduce electrical and optical crosstalk.

Figure 9:
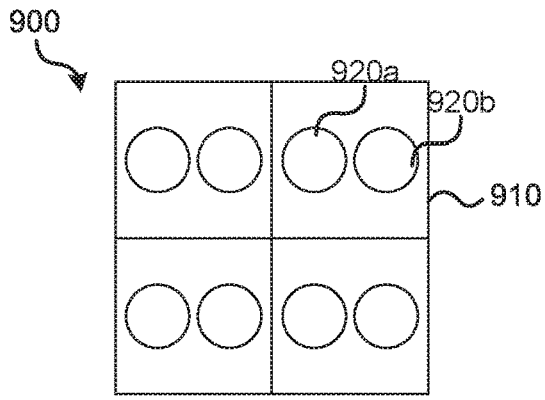
FIG. 9 shows a top view of an image sensor assembly, including two imaged features aligned over each pixel, in accordance with implementations.

FIG. 9 shows a top view of an image sensor assembly 900, including two imaged features 920a-920b aligned over each pixel 910. For example, features 920a-920 may have been formed over pixel 910 during fabrication of an image sensor assembly (e.g., by photolithographically aligning a nanowell pattern with pixels of an active pixel sensor). For simplicity, four pixels are shown. By way of example, each pixel 910 may be a light sensor 440 and features 920a-920b may be reaction recesses 408 as illustrated in FIGS. 7-8. Light emitted from each of features 920a-920b may be directed into the pixel using a light guide 462 as described above. In some implementations, to limit crosstalk between adjacent features 920a-920b, the spacing of the features over the pixel and width of fringes used to illuminate the features may be tuned.

Figure 10:
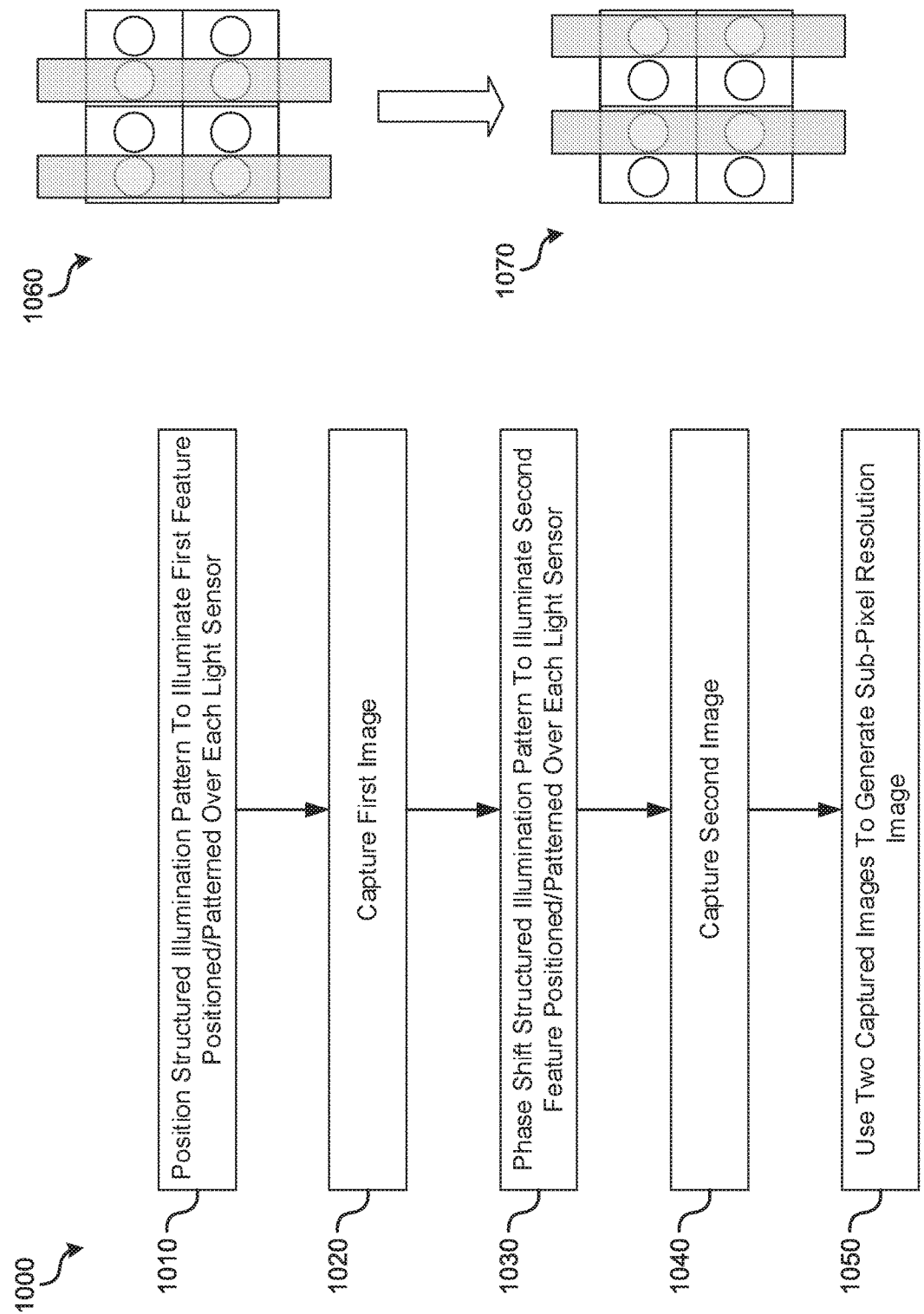
FIG. 10 is an operational flow diagram illustrating an example one-dimensional structured illumination method that may be implemented by a structured illumination imaging assembly during one imaging cycle to image a sample including two features positioned over each light detector (e.g., pixel) of the imaging assembly.

FIG. 10 is an operational flow diagram illustrating an example one-dimensional structured illumination method 1000 that may be implemented by a structured illumination imaging assembly during one imaging cycle to image a sample including two features positioned over each light detector (e.g., pixel) of the imaging assembly. For example, method 1000 may be used to image samples as described above with reference to FIGS. 1 and 7-9. In some cases, the features of the imaged sample may be formed over the pixels of the image sensor.

At operation 1010, the structured illumination pattern is positioned to illuminate a first feature positioned/patterned over each light sensor. For instance, as illustrated by configuration 1060, a vertical fringe illumination pattern may be positioned to illuminate features over the left side of each pixel but not the right side of each pixel. In implementations, this may be achieved by forming a structured light pattern having a pitch that is at least substantially the same as the pitch of the pixels of the image sensor (e.g., a 1 um pitch for square 1 um×1 um pixels) and width that is at least substantially the same as or slightly greater than the diameter of the features (e.g., as described above with reference to FIGS. 1A-1B). For example, in particular implementations, the width of each fringe is about half or less than half the pitch of each pixel and the center to center spacing between fringes is about the pitch of each pixel. At operation 1020, a first image of the sample is captured. For example, in the case of a fluorescent microscopy imaging system, some or all of the features over the left side of each pixel may emit light that is collected by a photodetector of the pixel and used to create a first image.

At operation 1030, the structured illumination pattern is phase shifted (e.g., translated over the sample over the sample plane) to illuminate a second feature positioned/patterned over each light sensor. For instance, as illustrated by configuration 1070, a vertical fringe illumination pattern may be positioned to illuminate features over the right side of each pixel but not the left side of each pixel. In implementations, the pattern may be phase shifted by rotating an optical mirror, by moving a translation stage, by rotating an optical wedge, or using some other optical phase modulator to shift the phase of the pattern on the sample plane. In particular implementations, the phase may be shifted by about ½ of the pitch of the fringe pattern (e.g., about ½ the pitch of the pixels). In other implementations, the illumination pattern may be shifted by using a second diffraction grating offset from the first diffraction grating by about ½ of a fringe. In such implementations, the first and second diffraction gratings may be fixed. At operation 1040, a second image of the sample is captured. For example, in the case of a fluorescent microscopy imaging system, some or all of the features over the right side of each pixel may emit light that is collected by a photodetector of the pixel and used to create a first image.

At operation 1050, the two captured images may be used to generate a sub-pixel resolution or super resolution image. For example, the intensities of each of the two feature sites over each pixel may be demultiplexed from the two captured images (e.g., intensity readout from left side features for first image and intensity readout for right side feature for second image). In some cases, crosstalk between the two images may be accounted for. Advantageously, the example of FIG. 10 only requires a diffraction pattern oriented in one direction (e.g., vertically) and illuminating a single feature per pixel, which may greatly simplify image processing (e.g., reduce or eliminate deconvolution of signal between two images).

It should be noted that although a vertical fringe illumination pattern and features positioned on the left and right side of each pixel are illustrated in the example configurations 1060-1070 of FIG. 10, these configurations are for the purpose of illustration. For example, in implementations where the features are patterned or otherwise positioned over the top and bottom of each pixel, the illumination pattern would instead be illustrated as a horizontal fringe illumination pattern that is shifted up or down during each image read.

In implementations, to keep the structured illumination pattern spatially aligned with the pixel pattern such that only one of the features of each pixel is illuminated during imaging (e.g., to maximize the signal from one of the features), the image sensor may include two alignment rows, where the sample is patterned such that only a respective one of the two features of the sample are positioned over pixels of each alignment row. In such implementations, the lack of one of the two features over each alignment row may create a differential transmission of excitation light to each of the two alignment rows that may be used to align the structured light with the sample and sensor.

Figure 11:
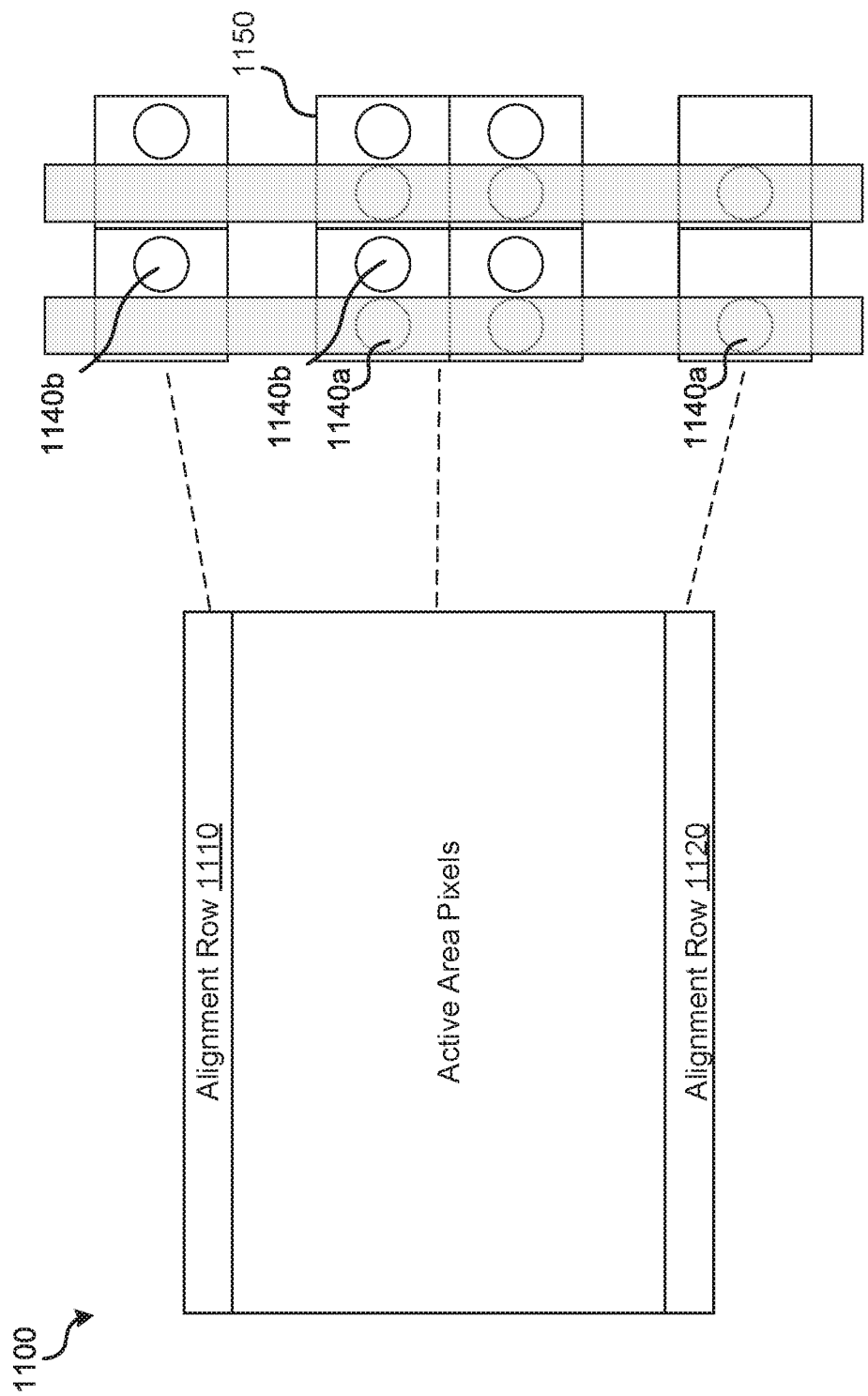
FIG. 11 illustrates an example of an image sensor including alignment rows that may be utilized in implementations to align a structured illumination pattern with a sample and sensor during a one-dimensional structured illumination imaging process.

FIG. 11 illustrates one such example of an image sensor 1100, including alignment rows 1110-1120, that may be utilized in implementations to align a structured illumination pattern with a sample and sensor. For example, consider the case where the features 1140a are formed over the left side of each active area pixel 1150 and features 1140b are formed over the right side of each active area pixel 1150. In this case, only features 1140a are formed over each pixel of alignment row 1120 and only features 1140b are formed over each pixel of alignment row 1110. During imaging, alignment may be confirmed based on the image readouts from each alignment row 1110-1120. For example, the structured illumination pattern may be aligned over features 1140a (left side of active area pixels) by positioning it such that the signal from alignment row 1120 is maximized while the signal from alignment row 1110 is minimized or even zero. The structured illumination pattern may also be aligned over features 1140b (right side of active area pixels) by positioning it such that the signal from alignment row 1110 is maximized while the signal from alignment row 1120 is minimized or even zero.

In implementations, alignment may be determined before imaging begins, e.g., before or during operation 1010 of a first imaging cycle. In some implementations, alignment may be periodically determined (e.g., after a predetermined number of imaging cycles). In some implementations, the readouts from alignment rows 1110-1120 may provide feedback to a structured illumination light positional control during imaging to prevent relative drift between the illumination pattern and image sensor over time or otherwise keep the illumination pattern spatially locked to the image sensor.

In some implementations, multiple alignments rows 1110 and multiple alignment rows 1120 may be included in the image sensor to add robustness to the system. For example, the inclusion of additional alignment rows may improve the signal generated to determine an alignment state of the system. Additionally, in some implementations, intermediate alignment rows may be included in the active area (e.g., about halfway in the active area) to confirm that the structured illumination is aligned vertically and not tilted.

It should be noted that although alignment rows are illustrated in the example of FIG. 11, in other implementations alignment columns (e.g., in the case of horizontal illumination of a pattern having features on the top and bottom of each pixel) may be similarly utilized.

Figure 12:
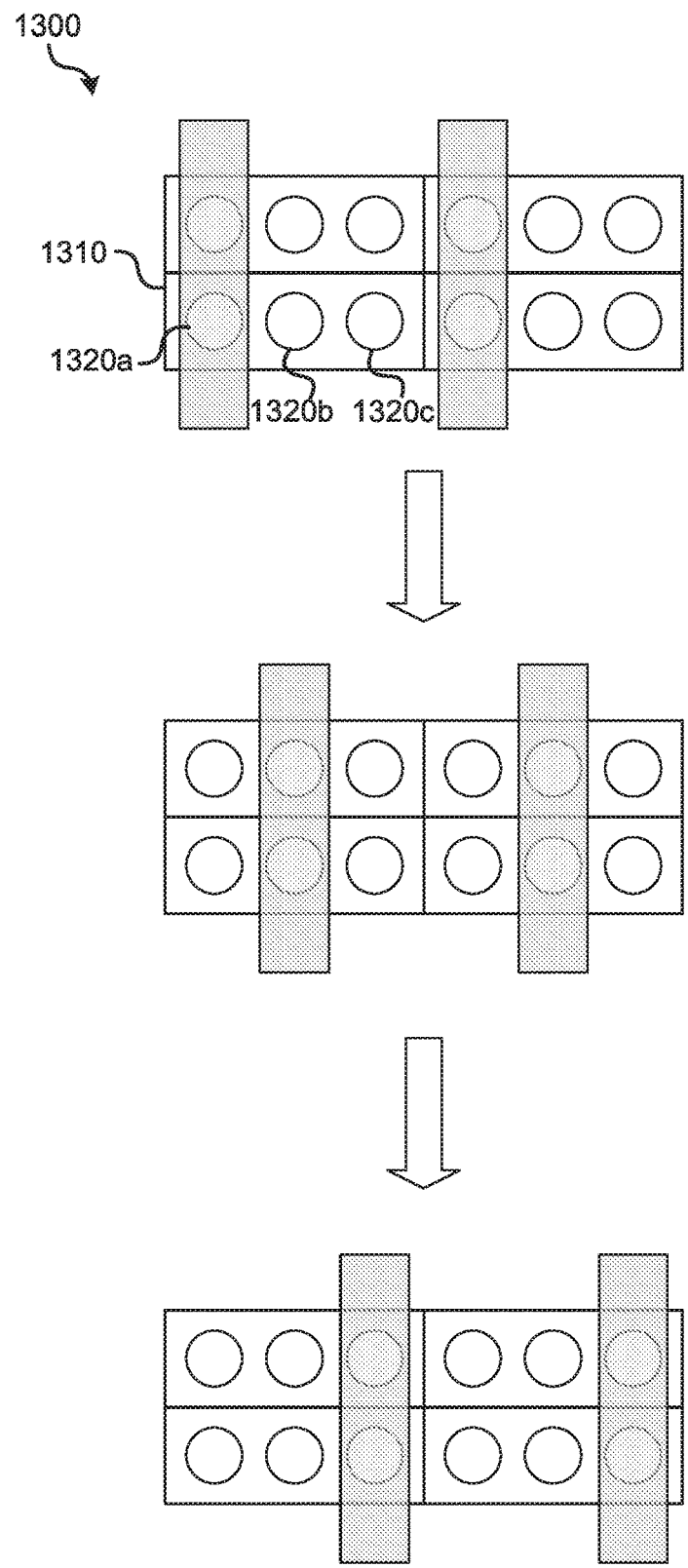
FIG. 12 illustrates an example one-dimensional structured illumination imaging process that may be implemented by an imaging assembly having rectangular pixels.

FIG. 12 illustrates an example one-dimensional structured illumination imaging process that may be implemented by an imaging assembly having rectangular pixels 1310. For simplicity, a top view of four rectangular pixels 1310 is shown during each image readout step. As illustrated in this example, three features 1320a-1320c are formed over each pixel. In this example, the phase of the structured light may be shifted by about ⅓ of the pitch of the fringe pattern (e.g., about ⅓ the pitch of the pixels) during each image readout to read features on the left (feature 1320a), center (feature 1320b), and right (feature 1320c) of each pixel. Advantageously, in the case of features aligned along one dimension over the pixel, and having a 1:1 or close to 1:1 aspect ratio (e.g., circular or square features), by utilizing a rectangular pixel aspect ratio, data density may be maximized by fitting a larger area of features 1320a-1320c over each pixel along one dimension. (e.g., as contrasted with fitting three circular features 1320a-1320c over a square pixel). A rectangular pixel aspect ratio may also be advantageous over a square pixel in cases of features not having a 1:1 aspect where a larger area of features may be aligned over each rectangular pixel along one dimension.

Figure 13:
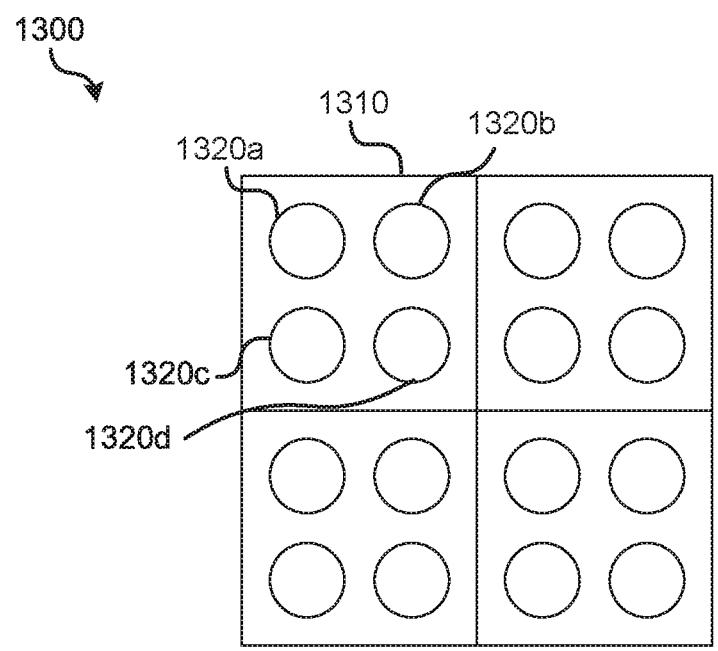
FIG. 13 shows a top view of an image sensor assembly, including four imaged features aligned over each pixel along two dimensions (e.g., along two rows and two columns).

FIG. 13 shows a top view of an image sensor assembly 1300, including four imaged features 1320a-1320d aligned over each pixel 1310 along two dimensions (e.g., along two rows and two columns). For example, features 1320a-1320d may have been formed over pixel 1310 during fabrication of an image sensor assembly (e.g., by photolithographically aligning a nanowell pattern with pixels of an active pixel sensor). For simplicity, four pixels are shown. In some implementations, to limit crosstalk between features 1320a-1320d, the spacing of the features over the pixel and width of fringes used to illuminate the features may be tuned (e.g., the features may be equidistantly positioned along both axes of the sample plane or only one axis, or the features may be positioned in some other formation).

By implementing the configuration of example assembly 1300, it may be possible to obtain four times the data density in features (as contrasted with the assembly of FIG. 2) by implementing a structured illumination method along two dimensions, further described below. For example, if each pixel has a pitch of about 2 μm, and each feature 1320a-1320d is a nanowell having a diameter of about 500 nm, it may be possible to obtain a data density of about $1 \times 10^8/\text{cm}^2$ features (as contrasted with a data density of about $2.5 \times 10^7/\text{cm}^2$ features in the case of a single 500 nm nanowell per 2 μm pixel). By way of example, only half of each pixel may be excited at a time with about 500 nm feature spacing and excitation wavelengths of about 530 nm. By changing the excitation wavelength to blue, higher densities may be achieved.

Figure 14A:
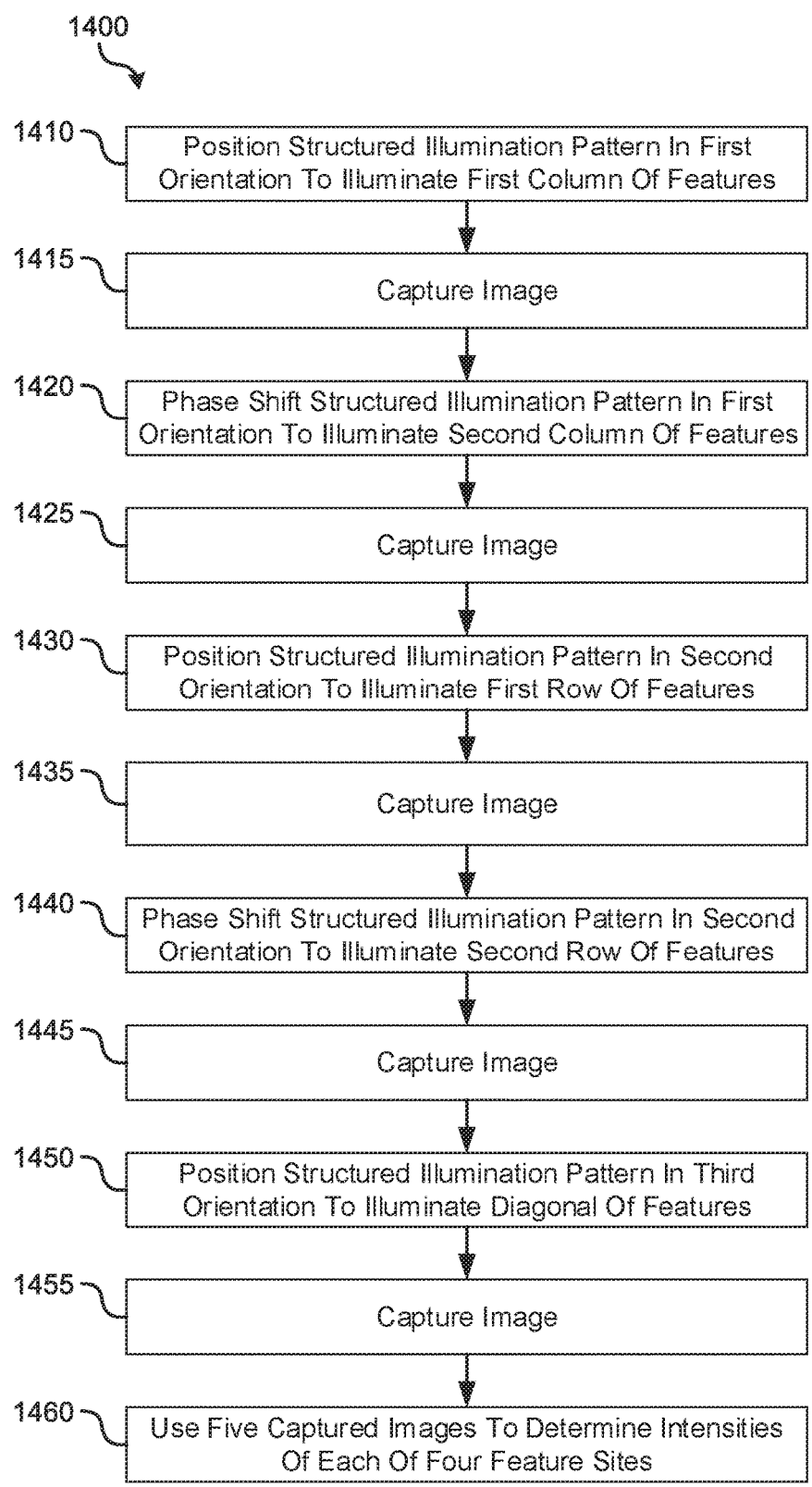
FIG. 14A is an operational flow diagram illustrating an example two-dimensional structured illumination method that may be implemented by a structured illumination imaging assembly during one imaging cycle to image a sample including four features positioned along two dimensions over each light detector (e.g., pixel) of the imaging assembly.

FIG. 14A is an operational flow diagram illustrating an example two-dimensional structured illumination method 1400 that may be implemented by a structured illumination imaging assembly during one imaging cycle to image a sample including four features positioned along two dimensions over each light detector (e.g., pixel) of the imaging assembly. For example, method 1400 may be used to image samples as described above with reference to FIG. 13. In some cases, the features of the imaged sample may be formed over the pixels of the image sensor. In the example of method 1400, the structured illumination system includes optical components to create two diffraction patterns that are orthogonal in the plane of the sample (e.g., a vertical diffraction grating and a horizontal diffraction grating) and an optical component (e.g., a third diffraction grating or a rotation stage to rotate one of the vertical diffraction or horizontal grating) to create a diffraction pattern that is offset about 45 degrees from the two other diffraction patterns.

At operation 1410, a structured illumination pattern in a first orientation is positioned to illuminate a first column of features (e.g., two features) over each light sensor. For instance, as illustrated by configuration 1471, a vertical fringe illumination pattern may be positioned to illuminate the two features over the left side of each pixel but not the two features over the right side of each pixel. In implementations, this may be achieved by forming a structured light pattern having a pitch that is at least substantially the same as the pitch of the pixels of the image sensor (e.g., a 1 um pitch for square 1 um×1 um pixels) and width that is at least substantially the same as or slightly greater than the diameter of the features (e.g., as described above with reference to FIGS. 1A-1B). For example, in particular implementations, the width of each fringe is about half or less than half the pitch of each pixel and the center to center spacing between fringes is about the pitch of each pixel. At operation 1415, a first image of the sample is captured. For example, in the case of a fluorescent microscopy imaging system, features 1320a and/or 1320c may emit light that is collected by a photodetector of the pixel and used to create a first image.

At operation 1420, the structured illumination pattern is phase shifted (e.g., translated over the sample over the sample plane) to illuminate a second column of features (e.g., two features) positioned/patterned over each light sensor. For instance, as illustrated by configuration 1472, a vertical fringe illumination pattern may be positioned to illuminate the two features over the right side of each pixel but not the two features over the left side of each pixel. In implementations, the pattern may be phase shifted by rotating an optical mirror, by moving a translation stage, by rotating an optical wedge, or using some other optical phase modulator to shift the phase of the pattern on the sample plane. In particular implementations, the phase may be shifted by about ½ of the pitch of the fringe pattern (e.g., about ½ the pitch of the pixels). In some implementations, the illumination pattern may be shifted by using a second vertical diffraction grating offset from a first vertical diffraction grating by about ½ of a fringe. In such implementations, the first and second vertical diffraction gratings may be fixed. At operation 1425, a second image of the sample is captured. For example, in the case of a fluorescent microscopy imaging system, features 1320b and/or 1320d may emit light that is collected by a photodetector of the pixel and used to create a second image.

At operation 1430, a structured illumination pattern in a second orientation is positioned to illuminate a first row of features (e.g., two features) over each light sensor. For instance, as illustrated by configuration 1473, a horizontal fringe illumination pattern may be positioned to illuminate the two features over the top side of each pixel but not the two features over the bottom side of each pixel. As previously discussed, this may be achieved by forming a structured light pattern having a pitch that is at least substantially the same as the pitch of the pixels of the image sensor and width that is at least substantially the same as or slightly greater than the diameter of the features. In implementations, the structured illumination pattern in the second orientation may be created by rotating a diffraction grating (e.g., 90°) or by utilizing a second diffraction grating (e.g., by switching a second diffraction grating into the illumination path). At operation 1435, a third image of the sample is captured. For example, in the case of a fluorescent microscopy imaging system, features 1320a and/or 1320b may emit light that is collected by a photodetector of the pixel and used to create a third image.

At operation 1440, the structured illumination pattern is phase shifted to illuminate a second row of features (e.g., two features) positioned/patterned over each light sensor. For instance, as illustrated by configuration 1474, a horizontal fringe illumination pattern may be positioned to illuminate the two features over the bottom side of each pixel but not the two features over the top side of each pixel. In some implementations, the illumination pattern may be shifted by using a second horizontal diffraction grating offset from a first horizontal diffraction grating by about ½ of a fringe. In such implementations, the first and second horizontal diffraction gratings may be fixed. At operation 1445, a fourth image of the sample is captured. For example, in the case of a fluorescent microscopy imaging system, features 1320c and/or 1320d may emit light that is collected by a photodetector of the pixel and used to create a fourth image.

At operation 1450, a structured illumination pattern in a third orientation is positioned to illuminate a diagonal of features (e.g., two features) over each light sensor. For instance, as illustrated by configuration 1475, a diagonal fringe illumination pattern may be positioned to illuminate the two features on the top right side and bottom left side of each pixel but not the other two features. Alternatively, a diagonal fringe illumination pattern may be positioned to illuminate the two features on the top left side and bottom right side of each pixel but not the other two features. In implementations, the structured illumination pattern in the third orientation may be created by rotating a diffraction grating (e.g., 45°) or by utilizing a second or third diffraction grating (e.g., by switching a third diffraction grating into the illumination path). At operation 1455, a fifth image of the sample is captured. For example, in the case of a fluorescent microscopy imaging system, features 1320a and/or 1320d may emit light that is collected by a photodetector of the pixel and used to create a fifth image.

Figure 14A:
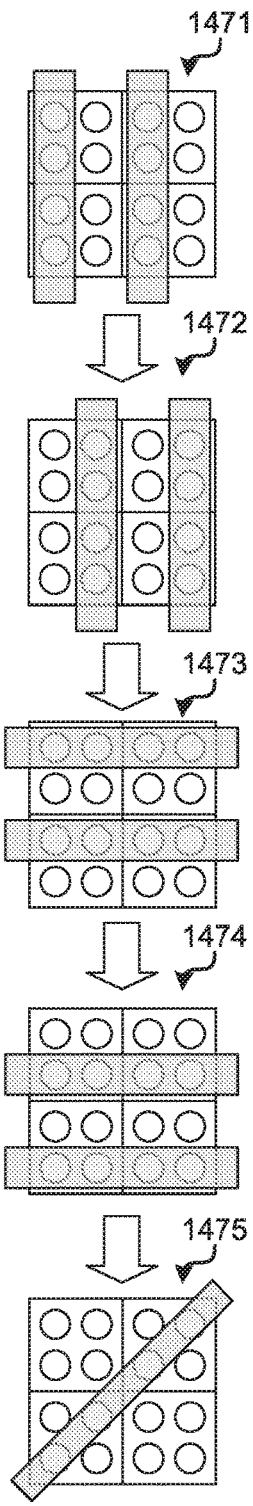

At operation 1460, the five captured images may be used to generate a sub-pixel resolution or super resolution image. For example, the intensities of each of the four feature sites over each pixel may be demultiplexed from the five captured images (e.g., readout intensity of five subpixel pairs). In the example of FIG. 14, as each pixel may capture photons from two different feature sites (two features over each pixel are illuminated during each image readout), the signal readings from each pixel may need to be deconvoluted to distinguish the individual signal generated by each of the sites.

Figure 14B:
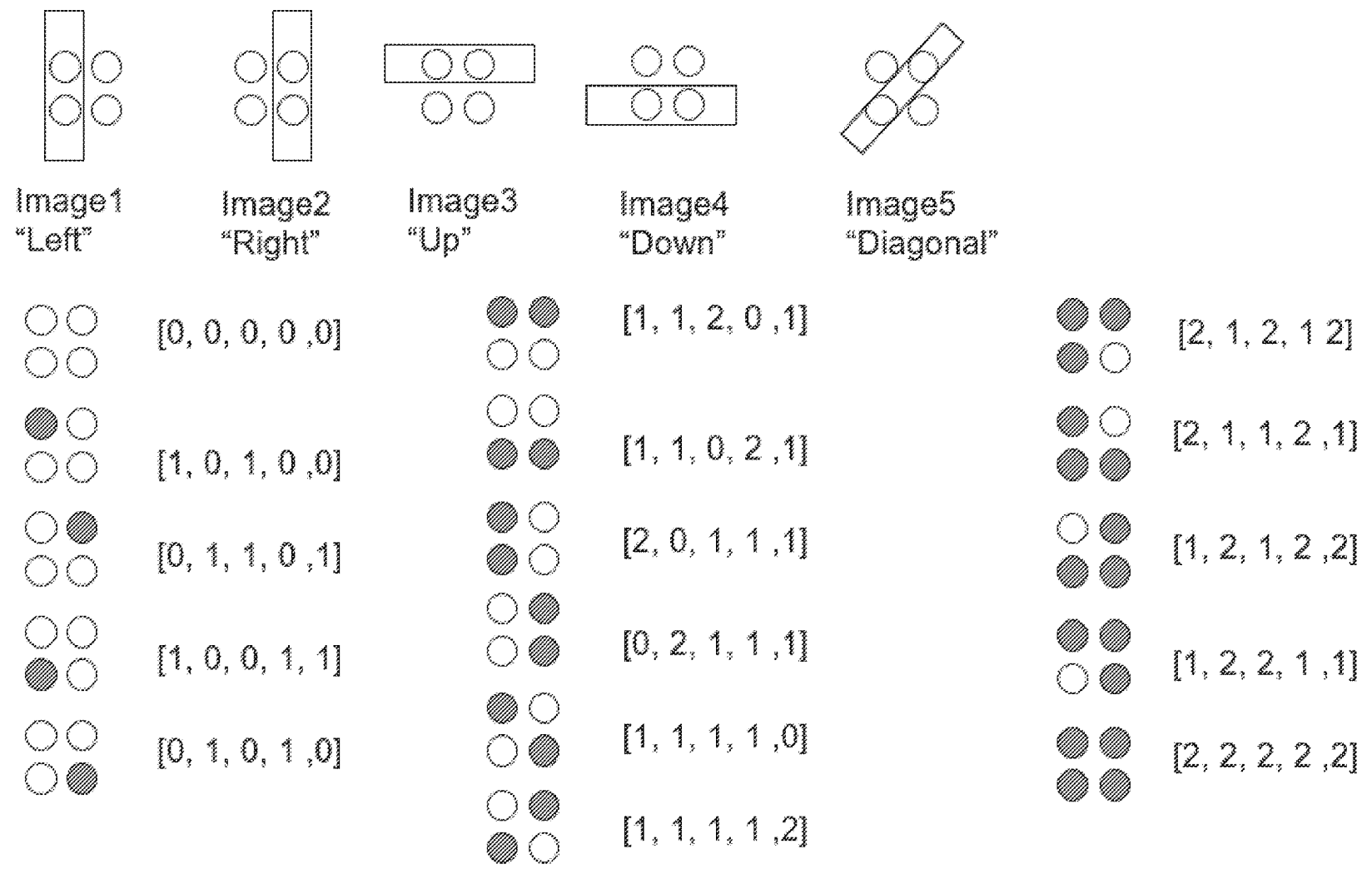

By way of example, FIG. 14B illustrates how the five images captured using method 1400 may be decoded to estimate the signal intensities of each of four features patterned over a pixel (e.g., to determine whether each feature emits fluorescence light in response to being illuminated). In this example, a shaded feature represents a feature emitting light during an imaging cycle (during capture of the five images), and a non-shaded feature represents a feature that does not emit light during an imaging cycle. Each vector provides a representation of the expected intensity in each of the five images when different sets of features emit light, where the leftmost entry of the vector corresponds to image 1 and the rightmost entry of the vector corresponds to image 5. A vector entry of 0 represents the case where no light is emitted by a feature (e.g., background signal), a vector entry of 1 represents the case where one feature emits light, and a vector entry of 2 represents the case where two features emit light. As illustrated in this example, each vector of expected intensities is unique (i.e., there are no degeneracies), which allows for unique identification of each of the 16 possible light emission cases by the four features of the pixel. For example, the five captured images may be used to create a vector of intensities that is matched to one of the sixteen vectors of expected intensities.

For example, in cases where no features emit light (e.g., no fluorescence occurs in response to the features being illuminated by the five structured light patterns), the vector of expected intensities is a zero vector [0,0,0,0,0] (i.e., no signal from features registered in five images). As another example, in cases where the left column of features emit light, the vector of expected intensities is [2,0,1,1,1]. In other words, it is expected for the first image to register the intensity of the two emitting leftmost features (e.g., the structured light illuminates the two leftmost features, which emit light), for the second image to not register any intensity from emitting features (e.g., the structured light illuminates the two rightmost features, which do not emit light), and for the third, fourth, and fifth images to register the intensity of one emitting feature (e.g., the structured light illuminates one of the features that emit light).

Figure 15:
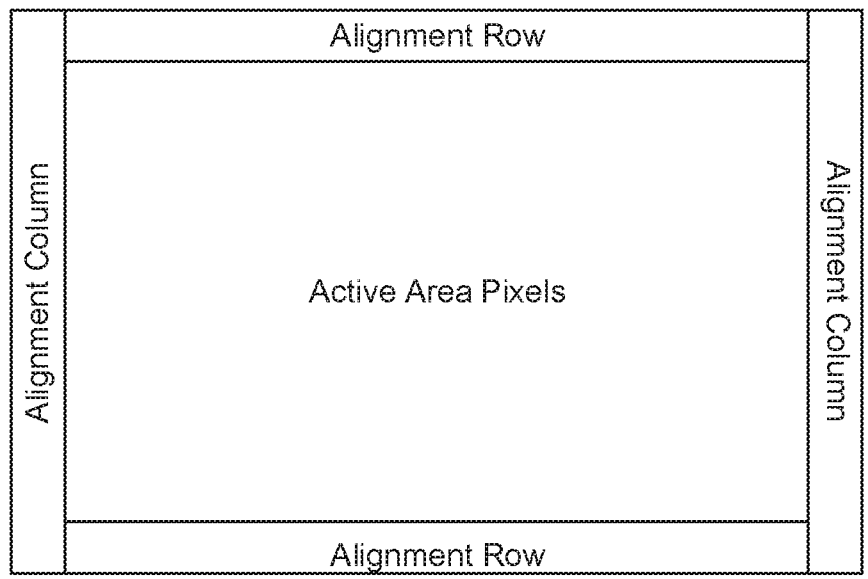
FIG. 15 illustrates an image sensor including two alignment rows and two alignment columns that may be utilized in implementations to align structured illumination patterns along first and second orthogonal directions with a sample and sensor during a two-dimensional structured illumination imaging process.

FIG. 15 illustrates an image sensor including two alignment rows and two alignment columns that may be utilized in implementations to align structured illumination patterns along first and second orthogonal directions with a sample and sensor (e.g., during method 1400). The design illustrated by FIG. 15 may be implemented in image sensor assembly 1300 by forming only a respective one of the four features 1320a-1320d over each pixel of the two rows and two columns. For example, only features 1320a may be formed over one of the alignment rows, only features 1320d may be formed over the other alignment row, only features 1320b may be formed over one of the alignment columns, and only features 1320c may be formed over the other alignment column. In some implementations, additional alignments rows for each feature and/or additional alignment columns for each feature may be included in the image sensor to add robustness to the system.

Figure 16A:
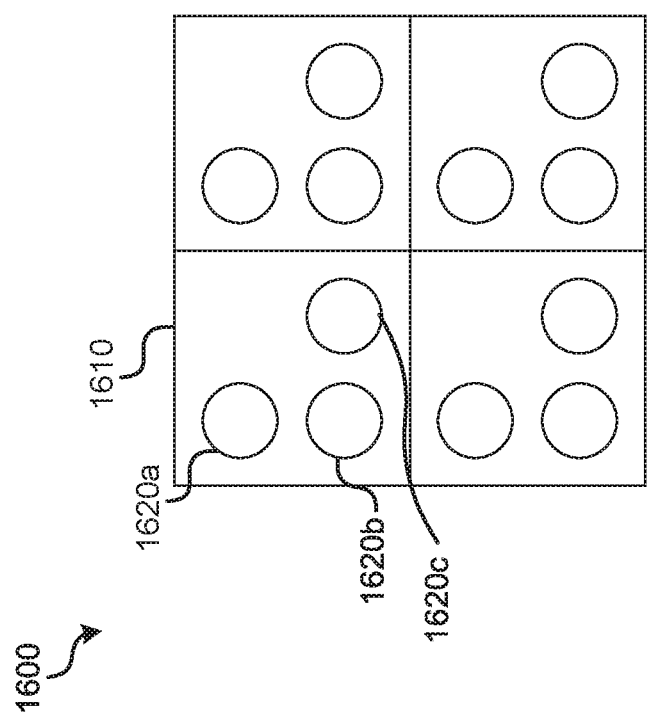
FIG. 16A shows a top view of an image sensor assembly including three imaged features aligned over each pixel along two dimensions in an L-shape.

FIG. 16A shows a top view of an image sensor assembly 1600, including three imaged features 1620a-1620c aligned over each pixel 1610 along two dimensions (e.g., along two rows and two columns) in an L-shape. For example, features 1620a-1620c may have been formed over pixel 1610 during fabrication of an image sensor assembly (e.g., by photolithographically aligning a nanowell pattern with pixels of an active pixel sensor). For simplicity, four pixels are shown. In the example implementation of FIG. 16A, the features are arranged in an L-shape whereby one of the rows and columns includes only one feature and the other row and column includes two features.

Figure 16B:
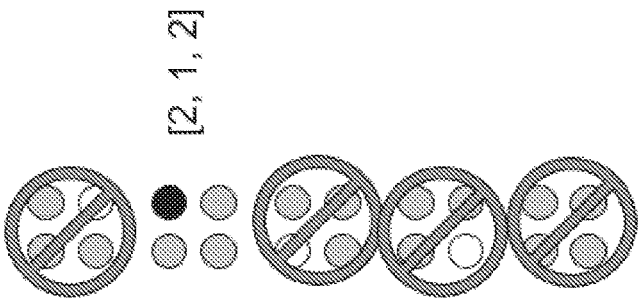
FIG. 16B illustrates how three images in two dimensions of the pixel of FIG. 16A may be decoded to estimate the signal intensities of each of the three features.
Figure 16B:

One advantage that may be provided by the configuration of assembly 1600 is that only three images need to be captured during an image cycle such that the 8 possible light emission cases by the three features of the pixel may be uniquely identified. Additionally, no diagonal fringe images need to be captured, which may simplify the optical arrangement of the imaging system. By way of example, FIG. 16B illustrates how three images in two dimensions of a pixel 1610 with patterned features 1620a-1620c may be decoded to estimate the signal intensities of each of the three features in contrast to the case where five images are captured to decode the signal intensities of four features captured in two dimensions (e.g., method 1400). In this example, a gray feature represents a feature emitting light during an imaging cycle (during capture of the three images), a non-shaded feature represents a feature that does not emit light during an imaging cycle, and a black feature represents a fourth feature that is not present in this case and is shown for comparison with FIG. 15B. As in the example of FIG. 15B, a vector entry of 0 represents the case where no light is emitted by a feature (e.g., background signal), a vector entry of 1 represents the case where one feature emits light, and a vector entry of 2 represents the case where two features emit light.

As illustrated in this example, each vector of expected intensities is unique (i.e., there are no degeneracies), which allows for unique identification of each of the 8 possible light emission cases by the three features of the pixel. For example, the three captured images may be used to create a vector of intensities that is matched to one of the eight vectors of expected intensities. Additionally, only two phase images captured using a structured illumination pattern in one direction and one phase image captured using a structured illumination pattern in a second, orthogonal direction are needed to determine intensities of each of the three feature sites during an image cycle.

Figure 17:
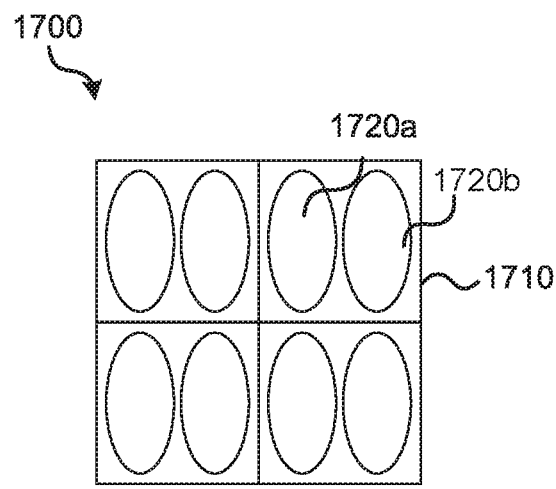
FIG. 17 shows a top view of an example image sensor assembly including two elliptically shaped features aligned over each square pixel along one dimension.
Figure 18:
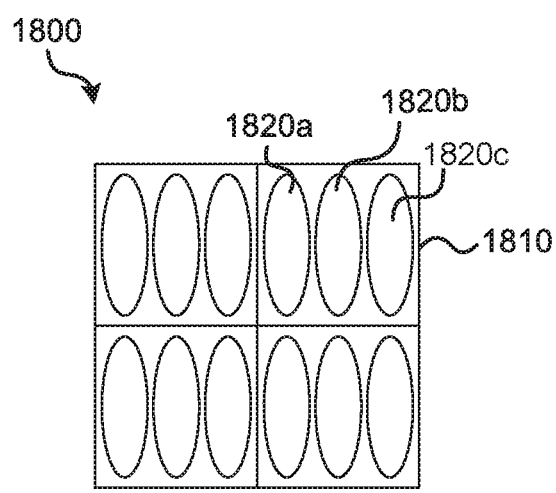
FIG. 18 shows a top view of an example image sensor assembly including three elliptically shaped features aligned over each square pixel along one dimension.

In some implementations, the plurality of features aligned and/or formed over each pixel may be shaped such that they have some other aspect ratio besides 1:1 (e.g., are not circular or square) such that features having a larger area are aligned over each pixel. This may improve data density during each imaging cycle and may also increase the signal at each pixel during image readout due to the increased area of each feature. FIGS. 17-18 show examples of how the feature aspect ratio may be modified to improve data density in the case of features aligned over square pixels along one dimension.

FIG. 17 shows a top view of an example image sensor assembly 1700, including two elliptically shaped features 1720a-1720b aligned over each square pixel 1710 along one dimension. For example, features 1720a-1720b may have been formed over pixel 1710 during fabrication of an image sensor assembly. For simplicity, four pixels are shown. As illustrated in this example, the elliptical features have an aspect ratio of up to 1:2 (e.g., ratio between diameters along the major axis and minor axis). For example, in particular implementations each pixel may have two elliptically shaped nanowells having a 1:2 aspect ratio aligned over it along one dimension. As compared with the example of FIG. 9, which shows two circular features aligned over a pixel, the size of the elliptical features 1720-1720b aligned over each pixel 1710 is greater.

FIG. 18 shows a top view of an example image sensor assembly 1800, including three elliptically shaped features 1820a-1820c aligned over each square pixel 1810 along one dimension. For example, features 1820a-1820c may have been formed over pixel 1810 during fabrication of an image sensor assembly. For simplicity, four pixels are shown. As illustrated in this example, the elliptical features have an aspect ratio of up to 1:3 (e.g., ratio between diameters along the major axis and minor axis). For example, in particular implementations each pixel may have three elliptically shaped nanowells having a 1:3 aspect ratio aligned over it along one dimension.

As used herein, the term module might describe a given unit of functionality that can be performed in accordance with one or more implementations of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

In this document, the terms "computer readable medium", "computer usable medium" and "computer program medium" are used to generally refer to non-transitory media, volatile or non-volatile, such as, for example, a memory, storage unit, and media. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings).

Although described above in terms of various example implementations, it should be understood that the various features, aspects and functionality described in one or more of the individual implementations are not limited in their applicability to the particular implementation with which they are described, but instead can be applied, alone or in various combinations, to one or more of the other implementations of the application, whether or not such implementations are described and whether or not such features are presented as being a part of a described implementation. Thus, the breadth and scope of the present application should not be limited by any of the above-described example implementations.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

To the extent applicable, the terms "first," "second," "third," etc. herein are merely employed to show the respective objects described by these terms as separate entities and are not meant to connote a sense of chronological order, unless stated explicitly otherwise herein.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide some instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various implementations set forth herein are described in terms of example block diagrams, flow charts and other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

While various implementations of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various implementations be implemented to perform the recited functionality in the same order unless the context dictates otherwise.

What is claimed is:

1. A system, comprising:
a light emitter to emit a light;
a flow cover operatively coupled to a detector surface;
a flow channel defined between the flow cover and the detector surface, the flow channel having a height extending between an under surface of the flow cover and the detector surface, wherein the height is between about 50 µm and about 400 µm; and
a detection device, comprising:
an image sensor comprising a plurality of active area pixels and first and second alignment rows or columns of alignment pixels, wherein only one alignment feature is patterned over each of the alignment pixels in the first and second alignment rows or columns of alignment pixels;
a plurality of sets of at least two patterned features, wherein each of the patterned features comprises a reaction site containing one or more nucleic acid molecules, wherein each of the plurality of sets of at least two patterned features is aligned over a respective one of the plurality of active area pixels;
the detector surface; and
an optical assembly to project a first set of a first plurality of fringes on a plane of the detection device shaped so that a fringe width of the first plurality of fringes is at least about the same or greater than a dimension of one of the at least two patterned features and is less than a pitch of the respective one of the plurality of active area pixels, the optical assembly comprising:
one or more diffraction gratings to diffract the light emitted by the light emitter to the optical assembly to form the first set of the first plurality of fringes, and
one or more optical phase modulators to phase shift the first set of the first plurality of fringes between a first phase and a second phase,
wherein, when the first set of the first plurality of fringes are in the first phase, the first set of the first plurality of fringes illuminates a first set of at least one of the patterned features of the at least two patterned features aligned over the respective one of the plurality of active area pixels,
wherein, when the first set of the first plurality of fringes are in the second phase, the first set of the first plurality of fringes illuminates a second set of at least one of the patterned features of the at least two patterned features aligned over the respective one of the plurality of active area pixels,
wherein the first set of at least one of the patterned features is not overlapping with the second set of at least one of the patterned features,
wherein the at least two patterned features is formed over a single light guide of the respective one of the plurality of active area pixels,
wherein the first and second alignment rows or columns of alignment pixels are to spatially align the first set of the first plurality of fringes with one of the at least two patterned features aligned over the respective one of the plurality of active area pixels,
and wherein the image sensor is an active pixel image sensor.

2. The system of claim 1, wherein the image sensor is a complementary metal-oxide-semiconductor (CMOS) image sensor.

3. The system of claim 1, wherein the one or more diffraction gratings are configured to form a second set of a second plurality of fringes orthogonally oriented relative to the first set of the first plurality of fringes, the optical assembly to project the second set of the second plurality of fringes on the plane of the detection device, the one or more optical phase modulators to phase shift the second set of the second plurality of fringes between a third phase and a fourth phase,
wherein, when the second set of the second plurality of fringes is in the third phase, the second set of the second plurality of fringes illuminates a third set of at least one of the patterned features of the at least two patterned features aligned over the respective one of the plurality of active area pixels, and
wherein, when the second set of the second plurality of fringes is in the fourth phase, the second set of the second plurality of fringes illuminates a fourth set of at least one the patterned features of the at least two patterned features aligned over the respective one of the plurality of active area pixels, and
wherein the third set of at least one of the patterned features is not overlapping with the fourth set of at least one of the patterned features.

4. The system of claim 3, wherein the one or more diffraction gratings to diffract the light emitted by the light emitter comprises a horizontal transmissive diffraction grating to form the first set of the first plurality of fringes and a vertical transmissive diffraction grating to form the second set of the second plurality of fringes.

5. The system of claim 3, wherein the at least two patterned features are four patterned features positioned over a respective one of the plurality of active area pixels, wherein the four patterned features are arranged in a square grid over the respective one of the plurality of active area pixels.

6. The system of claim 3, wherein the at least two patterned features are three patterned features positioned over a respective one of the plurality of active area pixels, wherein the three patterned features are arranged in an L-shape over the respective one of the plurality of active area pixels.

7. The system of claim 1, wherein each of the plurality of active area pixels is a rectangular pixel, wherein the at least two patterned features of the detection device are aligned over the respective one of the plurality of active area pixels in a linear array.

8. The system of claim 1, wherein each of the plurality of active area pixels is a square pixel, wherein the at least two patterned features comprises two features having an aspect ratio of about 2:1.

9. The system of claim 1, wherein each of the plurality of active area pixels is a square pixel, wherein the at least two patterned features comprises three features having an aspect ratio of about 3:1.

10. The system of claim 1, wherein:
the pitch of the respective one of the plurality of active area pixels is 1 micron; or
the pitch of the respective one of the plurality of active area pixels is about 2 microns.

11. The system of claim 1, wherein each of the plurality of active area pixels is a light sensor having a detection area of about 1 $\mu m^2$ to about 2 $\mu m^2$.